(12) United States Patent
Asagi et al.

(10) Patent No.: US 12,366,775 B2
(45) Date of Patent: Jul. 22, 2025

(54) LIQUID CRYSTAL ELEMENT AND HEAD MOUNTED DISPLAY

(71) Applicant: Sharp Display Technology Corporation, Kameyama (JP)

(72) Inventors: Hiroaki Asagi, Kameyama (JP); Kiyoshi Minoura, Kameyama (JP); Daisuke Minami, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/806,501

(22) Filed: Aug. 15, 2024

(65) Prior Publication Data
US 2025/0102867 A1 Mar. 27, 2025

(30) Foreign Application Priority Data
Sep. 27, 2023 (JP) ................. 2023-166082

(51) Int. Cl.
*G02F 1/1337* (2006.01)
*G02F 1/13363* (2006.01)
*G02F 1/1343* (2006.01)
*G06F 1/16* (2006.01)

(52) U.S. Cl.
CPC .. *G02F 1/133738* (2021.01); *G02F 1/133638* (2021.01); *G02F 1/134309* (2013.01); *G06F 1/163* (2013.01)

(58) Field of Classification Search
CPC .............. G02F 1/133738; G02F 1/133638
See application file for complete search history.

(56) References Cited

U.S. PATENT DOCUMENTS

| | | | |
|---|---|---|---|
| 10,379,419 | B1 | 8/2019 | Lu et al. |
| 2019/0227375 | A1 | 7/2019 | Oh et al. |
| 2022/0146888 | A1 | 5/2022 | Oh et al. |
| 2023/0176424 | A1 | 6/2023 | Minami et al. |
| 2023/0280632 | A1 | 9/2023 | Minami et al. |

FOREIGN PATENT DOCUMENTS

| | | |
|---|---|---|
| JP | 2021-501361 A | 1/2021 |
| JP | 2023-082644 A | 6/2023 |
| JP | 2023-121716 A | 8/2023 |

*Primary Examiner* — Joseph L Williams
(74) *Attorney, Agent, or Firm* — ScienBiziP, P.C.

(57) ABSTRACT

Provided is a liquid crystal element sequentially including: a first substrate; a first weak anchoring horizontal alignment film; a liquid crystal layer containing dual-frequency liquid crystal molecules; a second weak anchoring horizontal alignment film; and a second substrate. At least one of the first substrate or the second substrate includes a comb-teeth electrode for electric field generation in the liquid crystal layer. The dual-frequency liquid crystal molecules are twist-aligned between the first and second substrate with voltage applied and with no voltage applied. A direction of twist of the dual-frequency liquid crystal molecules with voltage applied and that with no voltage applied are the same. An alignment direction of dual-frequency liquid crystal molecules in a center of the liquid crystal layer in a thickness direction is orthogonal or parallel to an extension direction of the comb-teeth electrode.

18 Claims, 18 Drawing Sheets

LIQUID CRYSTAL ELEMENT AND HEAD MOUNTED DISPLAY

CROSS-REFERENCE TO RELATED APPLICATIONS

The present application claims priority under 35 U.S.C. § 119 to Japanese Patent Application No. 2023-166082 filed on Sep. 27, 2023, the contents of which are incorporated herein by reference in their entirety.

BACKGROUND OF THE INVENTION

Field of the Invention

The following disclosure relates to liquid crystal elements and head mounted displays.

Description of Related Art

There have been suggestions to use varifocal optical systems including a Pancharatnam-Berry (PB) lens in combination with other liquid crystal element(s) such as a switchable half wave plate (sHWP) in devices such as head mounted displays. A sHWP can switch between left- and right-handed circularly polarized lights using liquid crystals.

Techniques related to varifocal optical systems include, for example, a display device disclosed in JP 2021-501361 T which includes a waveguide and a broad bandwidth adaptive lens assembly. The waveguide is configured to guide light in a lateral direction parallel to an output surface of the waveguide, and is further configured to outcouple the guided light through the output surface. The broad bandwidth adaptive lens assembly is configured to incouple and to diffract therethrough the outcoupled light from the waveguide.

U.S. Pat. No. 10,379,419 B1 discloses a varifocal block including a sHWP and a plurality of liquid crystal lenses.

JP 2023-082644 A discloses an optical element including a liquid crystal cell including a first substrate, a liquid crystal layer, and a second substrate; and a quarter-wave film, the liquid crystal layer containing liquid crystal molecules twist-aligned between the first substrate and the second substrate, the liquid crystal cell including electrodes, the electrodes disposed to enable switching between a first state and a second state by application of voltage to the liquid crystal layer, the switching between the first state and the second state controlling a polarization state of light incident on the liquid crystal cell, wherein circularly polarized light incident on the liquid crystal cell is converted to first linearly polarized light in the first state, while in the second state, converted to second linearly polarized light, and wherein linearly polarized light incident on the liquid crystal cell is converted to first circularly polarized light in the first state, while in the second state, converted to second circularly polarized light.

JP 2023-121716 A discloses an optical element including a first liquid crystal cell including first liquid crystal molecules and a first electrode; and a second liquid crystal cell including second liquid crystal molecules and a second electrode, the first electrode and the second electrode disposed to enable switching between a first state and a second state, the first state twist-aligning the second liquid crystal molecules and perpendicularly aligning the first liquid crystal molecules, the second state twist-aligning the first liquid crystal molecules and perpendicularly aligning the second liquid crystal molecules, an alignment direction of second liquid crystal molecules near the third substrate in the first state and an alignment direction of second liquid crystal molecules near the fourth substrate in the first state being respectively at azimuthal angles resulting from a ¼ turn in the same direction of an azimuthal angle of an alignment direction of first liquid crystal molecules near the first substrate in the second state and an azimuthal angle of an alignment direction of first liquid crystal molecules near the second substrate in the second state.

BRIEF SUMMARY OF THE INVENTION

The techniques in JP 2021-501361 T and U.S. Pat. No. 10,379,419 B1 face difficulties in achieving a device structure that can switch between polarization modulation and no polarization modulation in a broad bandwidth and a wide viewing angle, the polarization modulation performing the polarization state conversion between left- and right-handed circularly polarized lights and the no polarization modulation not performing the polarization state conversion between left- and right-handed circularly polarized lights. It is difficult for the technique in JP 2023-082644 A to achieve a device structure that has excellent alignment stability. The technique in JP 2023-121716 A can produce a highly reliable device using a stack of twist-aligned liquid crystal layers, but the device has an undesirable increase in thickness or weight.

In response to the above issues, an object of the present invention is to provide a liquid crystal element and a head mounted display that can switch between polarization modulation and no polarization modulation in a broad bandwidth and a wide viewing angle and have excellent alignment stability.

(1) One embodiment of the present invention is directed to a liquid crystal element sequentially including: a first substrate; a first weak anchoring horizontal alignment film; a liquid crystal layer containing dual-frequency liquid crystal molecules; a second weak anchoring horizontal alignment film; and a second substrate, at least one of the first substrate or the second substrate including a comb-teeth electrode for electric field generation in the liquid crystal layer, the dual-frequency liquid crystal molecules being twist-aligned between the first substrate and the second substrate with voltage applied and with no voltage applied, a direction of twist of the dual-frequency liquid crystal molecules with voltage applied and a direction of twist of the dual-frequency liquid crystal molecules with no voltage applied being the same as each other, an alignment direction of dual-frequency liquid crystal molecules located in a center of the liquid crystal layer in a thickness direction being orthogonal or parallel to an extension direction of the comb-teeth electrode.

(2) In an embodiment of the present invention, the liquid crystal element includes the structure (1), and the first weak anchoring horizontal alignment film has an azimuthal angle anchoring energy of less than $1 \times 10^{-4}$ $J/m^2$.

(3) In an embodiment of the present invention, the liquid crystal element includes the structure (1) or (2), and the first weak anchoring horizontal alignment film contains a polymer including at least one of a group represented by the following structural formula (P1) or a group represented by the following structural formula (P2):

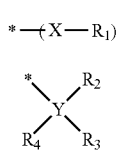

where X includes at least one of an ether group, an ester group, or an amide group; $R_1$, $R_2$, $R_3$, and $R_4$ each independently represent a hydrocarbon group; and Y represents a carbon atom or a silicon atom.

(4) In an embodiment of the present invention, the liquid crystal element includes the structure (1), (2), or (3), and the second weak anchoring horizontal alignment film has an azimuthal angle anchoring energy of less than $1 \times 10^{-4}$ J/m$^2$.

(5) In an embodiment of the present invention, the liquid crystal element includes the structure (1), (2), (3), or (4), and the second weak anchoring horizontal alignment film contains a polymer having at least one of a group represented by the following structural formula (P1) or a group represented by the following structural formula (P2):

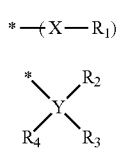

where X includes at least one of an ether group, an ester group, or an amide group; $R_1$, $R_2$, $R_3$, and $R_4$ each independently represent a hydrocarbon group; and Y represents a carbon atom or a silicon atom.

(6) In an embodiment of the present invention, the liquid crystal element includes the structure (1), (2), (3), (4), or (5), and the first weak anchoring horizontal alignment film and the second weak anchoring horizontal alignment film do not exhibit uniaxial alignment.

(7) In an embodiment of the present invention, the liquid crystal element includes the structure (1), (2), (3), (4), (5), or (6), and the first weak anchoring horizontal alignment film and the second weak anchoring horizontal alignment film each introduce an in-plane retardation of less than 1 nm.

(8) In an embodiment of the present invention, the liquid crystal element includes the structure (1), (2), (3), (4), (5), (6), or (7), and with no voltage applied, the alignment direction of the dual-frequency liquid crystal molecules located in the center of the liquid crystal layer in the thickness direction is orthogonal to the extension direction of the comb-teeth electrode.

(9) In an embodiment of the present invention, the liquid crystal element includes the structure (1), (2), (3), (4), (5), (6), (7), or (8), and the comb-teeth electrode is disposed only in either the first substrate or the second substrate.

(10) In an embodiment of the present invention, the liquid crystal element includes the structure (1), (2), (3), (4), (5), (6), (7), (8), or (9), the liquid crystal element further includes a first substrate side comb-teeth electrode disposed in the first substrate and a second substrate side comb-teeth electrode disposed in the second substrate, each of the first substrate side comb-teeth electrode and the second substrate side comb-teeth electrode being identical to the comb-teeth electrode, and an extension direction of the first substrate side comb-teeth electrode is parallel to an extension direction of the second substrate side comb-teeth electrode.

(11) In an embodiment of the present invention, the liquid crystal element includes the structure (1), (2), (3), (4), (5), (6), (7), (8), (9), or (10), and a ratio of an electrode width to a slit width ((electrode width):(slit width)) of the comb-teeth electrode is from 1:2 to 1:6.

(12) In an embodiment of the present invention, the liquid crystal element includes the structure (1), (2), (3), (4), (5), (6), (7), (8), (9), (10), or (11), and a ratio of a thickness of the liquid crystal layer to a slit width of the comb-teeth electrode ((thickness of liquid crystal layer):(slit width)) is from 1:2.5 to 1:10.

(13) In an embodiment of the present invention, the liquid crystal element includes the structure (1), (2), (3), (4), (5), (6), (7), (8), (9), (10), (11), or (12), and further includes a retardation film disposed on at least one of a side of the first substrate opposite to the liquid crystal layer or a side of the second substrate opposite to the liquid crystal layer.

(14) In an embodiment of the present invention, the liquid crystal element includes the structure (13), and the retardation film includes, in order from a side closer to the liquid crystal layer, a first quarter-wave film and a second quarter-wave film.

(15) In an embodiment of the present invention, the liquid crystal element includes the structure (1), (2), (3), (4), (5), (6), (7), (8), (9), (10), (11), (12), (13), or (14), at least one horizontal alignment film selected from the first weak anchoring horizontal alignment film and the second weak anchoring horizontal alignment film is in contact with the comb-teeth electrode and contains at least two polymers different in refractive index from each other, and a polymer having a smallest refractive index among the at least two polymers is in contact with the liquid crystal layer.

(16) In an embodiment of the present invention, the liquid crystal element includes the structure (1), (2), (3), (4), (5), (6), (7), (8), (9), (10), (11), (12), (13), (14), or (15), and a ratio of an azimuthal angle anchoring energy of the second weak anchoring horizontal alignment film to an azimuthal angle anchoring energy of the first weak anchoring horizontal alignment film is 10 or less.

(17) In an embodiment of the present invention, the liquid crystal element includes the structure (1), (2), (3), (4), (5), (6), (7), (8), (9), (10), (11), (12), (13), (14), (15), or (16), the first substrate or the second substrate includes a curved flexible printed circuit, and the comb-teeth electrode is disposed only in either the first substrate or the second substrate, whichever is located in a direction of curvature of the flexible printed circuit.

(18) Another embodiment of the present invention is directed to a head mounted display, including the liquid crystal element including the structure (1), (2), (3), (4), (5), (6), (7), (8), (9), (10), (11), (12), (13), (14), (15), (16), or (17).

The present invention can provide a liquid crystal element and a head mounted display that can switch between polarization modulation and no polarization modulation in a broad bandwidth and a wide viewing angle and have excellent alignment stability.

DETAILED DESCRIPTION OF THE INVENTION

Figure 1:
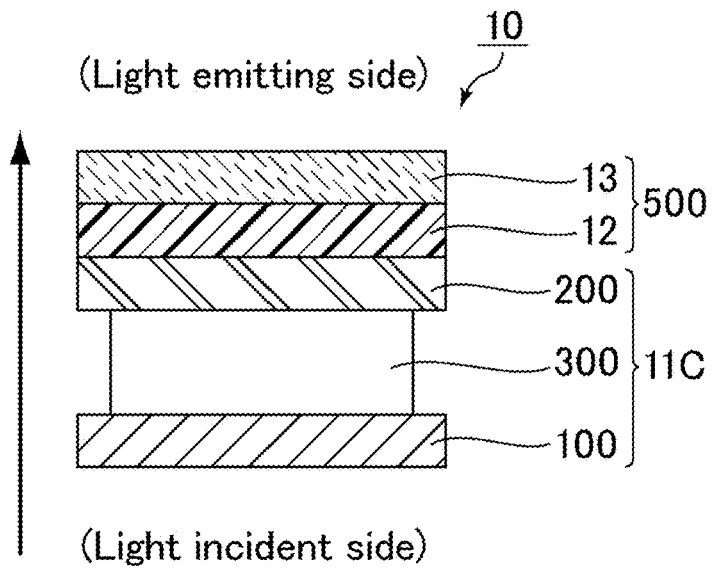
FIG. 1 is a schematic cross-sectional view of a liquid crystal element of Embodiment 1.

Hereinafter, embodiments of the present invention are described. The present invention is not limited to the contents of the following embodiments. The design may be modified as appropriate within the range satisfying the configuration of the present invention. In the following description, components having the same or similar functions in different drawings are commonly provided with the same reference sign so as to appropriately avoid repetition of description. The configurations of the present invention may appropriately be combined without departing from the spirit of the present invention.

DEFINITION OF TERMS

The "azimuth" herein means the direction in question in a view projected onto the surface of a substrate closer to the light emitting side of the liquid crystal element and is expressed as an angle (azimuthal angle) formed with the reference azimuth. The reference azimuth (0°) is set to the alignment direction of liquid crystal molecules near the first substrate in the first state in a view projected onto the surface of the substrate closer to the light emitting side of the element. In other words, the alignment direction of liquid crystal molecules near the first substrate in the first state is set at an azimuthal angle of 0°. The azimuthal angle is measured as positive in the counterclockwise direction from the reference azimuth and as negative in the clockwise direction from the reference azimuth. The counterclockwise direction and the clockwise direction are both the rotational directions when the liquid crystal element is viewed from its light emitting side. The azimuthal angle represents a value measured in a plan view of the light emitting side of the liquid crystal element.

The expression herein that two straight lines (including axes, directions, and azimuths) are orthogonal to each other means that they are orthogonal to each other in a plan view of the light emitting side of the liquid crystal element. The expression that one of two straight lines is oblique to the other means that the one straight line is oblique to the other in a plan view of the light emitting side of the liquid crystal element. Also, an angle formed between two straight lines means an angle formed between one of the straight lines and the other straight line in a plan view of the light emitting side of the liquid crystal element.

The expression herein that two straight lines (including axes, directions, and azimuths) are orthogonal to each other means that the angle formed between the straight lines is 90°±3°, preferably 90°±1°, more preferably 90°±0.5°, particularly preferably 90° (perfectly orthogonal). The expression herein that two straight lines are parallel to each other means that the angle formed between the straight lines is 0°±3°, preferably 0°±1°, more preferably 0°±0.5°, particularly preferably 0° (perfectly parallel).

Refractive Index (Nx, Ny, Nz)

"nx" represents a refractive index in a direction in which the refractive index in the plane is maximum (i.e., slow axis direction). "ny" represents a refractive index in a direction orthogonal to the slow axis in the plane. "nz" represents a refractive index in the thickness direction. A refractive index is a value at 23° C. for light having a wavelength of 550 nm, unless otherwise specified.

In-Plane Retardation (Re)

An in-plane retardation (Re) is an in-plane retardation introduced by a layer (film) at 23° C. to light having a wavelength of 550 nm, unless otherwise specified. Re can be determined from the equation Re=(nx−ny)×d, wherein d (nm) represents the thickness of the layer (film). The "retardation" herein refers to an in-plane retardation, unless otherwise specified.

Thickness Direction Retardation (Rth)

A thickness direction retardation (Rth) is a retardation in the thickness direction introduced by a layer (film) at 23° C. to light having a wavelength of 550 nm, unless otherwise specified. Rth can be determined from the equation Rth=(nz−(nx+ny)/2)×d, wherein d (nm) represents the thickness of the layer (film). Herein, the thickness direction retardation is also referred to as a "thickness retardation".

The measurement wavelength for optical parameters such as a principal refractive index and a retardation herein is 550 nm unless otherwise specified.

Hereinafter, embodiments of the present invention are described. The present invention is not limited to the following embodiments. The design may be modified as appropriate within the range satisfying the configuration of the present invention.

Embodiment 1

Figure 2:
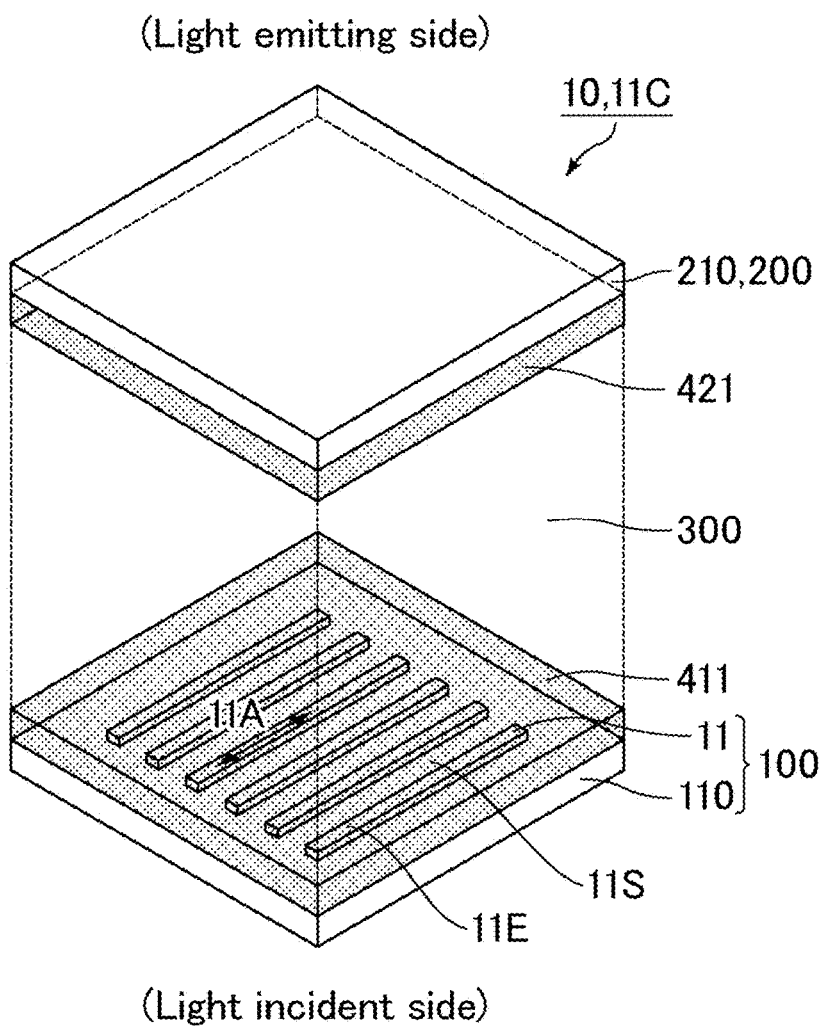
FIG. 2 is a schematic perspective view of the liquid crystal element of Embodiment 1.
Figure 3:
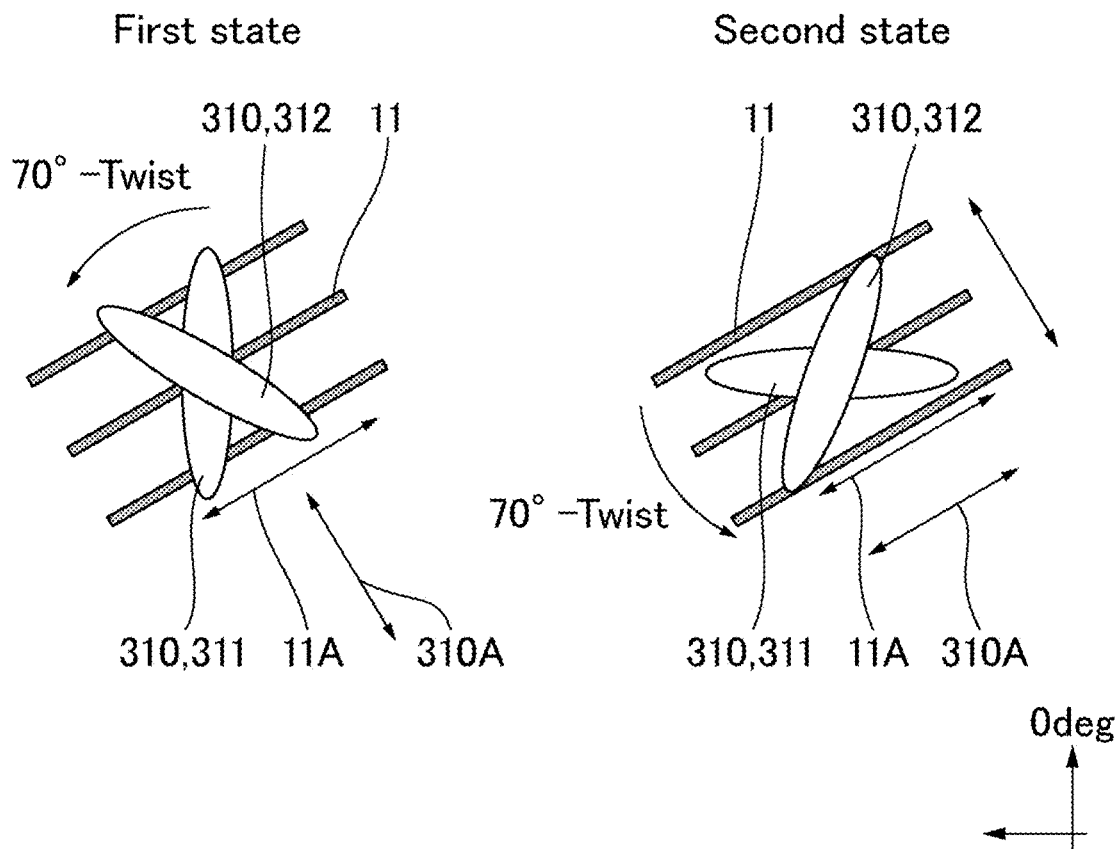
FIG. 3 includes schematic views showing the alignments of liquid crystal molecules in a first state and a second state in the liquid crystal element of Embodiment 1.
Figure 4:
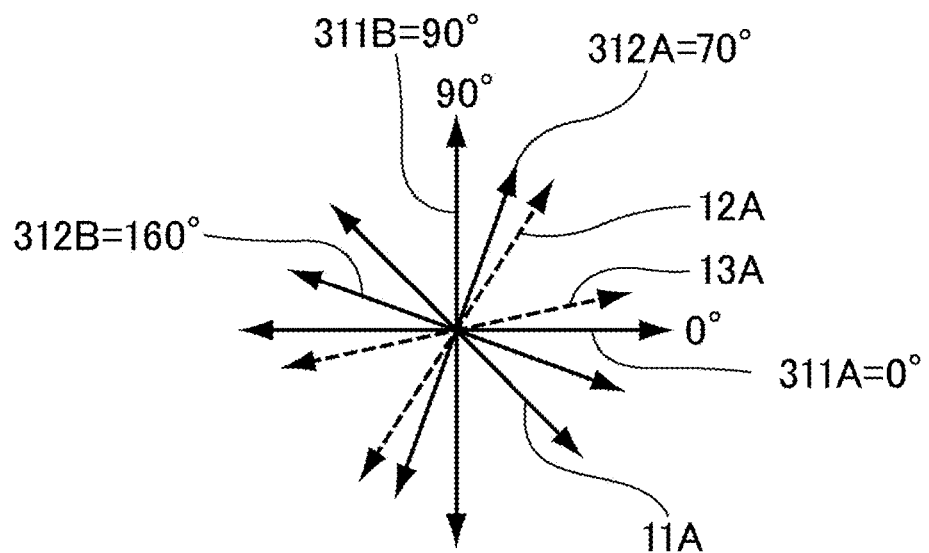
FIG. 4 shows axis azimuths of the liquid crystal element of Embodiment 1.

FIG. 1 is a schematic cross-sectional view of a liquid crystal element of Embodiment 1. FIG. 2 is a schematic perspective view of the liquid crystal element of Embodiment 1. FIG. 3 includes schematic views showing the alignments of liquid crystal molecules in a first state and a second state in the liquid crystal element of Embodiment 1. FIG. 4 shows axis azimuths of the liquid crystal element of Embodiment 1.

A liquid crystal element 10 of the present embodiment shown in FIG. 1 to FIG. 4 sequentially includes a first substrate 100, a first weak anchoring horizontal alignment film 411, a liquid crystal layer 300 containing dual-frequency liquid crystal molecules 310, a second weak anchoring horizontal alignment film 421, and a second substrate 200. At least one of the first substrate 100 or the second substrate 200 includes a comb-teeth electrode 11 for electric field generation (preferably, for transverse electric field generation) in the liquid crystal layer 300. The dual-frequency liquid crystal molecules 310 are twist-aligned between the first substrate 100 and the second substrate 200 with voltage applied and with no voltage applied. The direction of twist of the dual-frequency liquid crystal molecules 310 with voltage applied and the direction of twist of the dual-frequency liquid crystal molecules 310 with no voltage applied are the same as each other. The alignment direction of the dual-frequency liquid crystal molecules 310 located in the center of the liquid crystal layer 300 in a thickness direction is orthogonal or parallel to an extension direction 11A of the comb-teeth electrode 11. This configuration can improve the alignment stability.

The liquid crystal element 10 of the present embodiment is a phase modulation element that can switch between polarization modulation and no polarization modulation, the polarization modulation performing the polarization state conversion between left- and right-handed circularly polarized lights and the no polarization modulation performing the polarization state conversion between left- and right-handed circularly polarized lights. The phase modulation element preferably provides a high degree of circular polarization in both the modulation state and the no modulation state. When a strong anchoring alignment film is disposed as an alignment film between the first substrate and the liquid crystal layer or between the second substrate and the liquid crystal layer, liquid crystal molecules are easily aligned along the strong anchoring alignment film, so that the initial alignment is stable. However, the alignment controlling force of the strong anchoring alignment film restricts the movement of the liquid crystal molecules; this may, for example, improve the polarization modulation property in the modulation state while deteriorating the polarization modulation property in the no modulation state or may conversely, depending on the design, improve the polarization modulation property in the no modulation state while deteriorating the polarization modulation property in the modulation state. In other words, it is difficult to achieve a favorable polarization modulation property in both the modulation state and the no modulation state.

One possible solution to this issue is to provide weak anchoring alignment films, one in the first substrate and one in the second substrate. Yet, with weak anchoring alignment films which exert weak alignment controlling force, it is generally difficult to improve the alignment stability.

The present inventors have considered that the effect of a comb-teeth electrode disposed in a substrate works on the vicinities of the "substrate interface". Thus, the inventors have considered that the alignment of liquid crystal molecules located near the interfaces of the first substrate and the second substrate with the liquid crystal layer is suitable when the liquid crystal molecules are parallel or perpendicular to the extension direction of the comb-teeth electrode. In the present example employing weak anchoring alignment films in the respective substrates, however, the inventors found that the effect of the comb-teeth electrode can be made to work on liquid crystal molecules near the center of the liquid crystal layer (bulk), not on liquid crystal molecules near the interfaces.

Thus, the present embodiment employs a first weak anchoring horizontal alignment film 411 disposed between the first substrate 100 and the liquid crystal layer 300 and a second weak anchoring horizontal alignment film 421 disposed between the second substrate 200 and the liquid crystal layer 300, and uses the dual-frequency liquid crystal molecules 310, wherein the alignment direction of dual-frequency liquid crystal molecules 310 in the center of the liquid crystal layer 300 in the thickness direction is set orthogonal or parallel to the extension direction 11A of the comb-teeth electrode 11. This stabilizes the alignment of dual-frequency liquid crystal molecules 310 in regions apart from the interface between the first substrate 100 and the liquid crystal layer 300 and the interface between the second substrate 200 and the liquid crystal layer 300 (such dual-frequency liquid crystal molecules 310 are also referred to as bulk dual-frequency liquid crystal molecules 310), thus achieving favorable alignment stability. Hereinbelow, the liquid crystal element 10 of the present embodiment is described in detail.

As shown in FIG. 1 and FIG. 2, the first substrate 100 includes, in order toward the liquid crystal layer 300, a first supporting substrate 110 and the comb-teeth electrode 11. The second substrate 200 includes a second supporting substrate 210 and no comb-teeth electrode. The structure including the components from the first substrate 100 to the second substrate 200 is also referred to as a liquid crystal cell 11C. In other words, the first substrate 100, the first weak anchoring horizontal alignment film 411, the liquid crystal layer 300, the second weak anchoring horizontal alignment film 421, and the second substrate 200 constitute the liquid crystal cell 11C.

The comb-teeth electrode 11 is disposed to enable switching between a first state and a second state by application of voltage to the liquid crystal layer 300. The first state aligns the dual-frequency liquid crystal molecules 311 near the first substrate 100 in a first alignment direction 311A. The second state aligns the dual-frequency liquid crystal molecules 311 near the first substrate 100 in a second alignment direction 311B orthogonal to the first alignment direction 311A in a plan view.

The comb-teeth electrode 11 has a structure in which linear electrodes 11E and slits 11S alternate. An electrode width of the comb-teeth electrode 11 means the width of each linear electrode 11E. A slit width of the comb-teeth electrode 11 means the width of each slit 11S. A pitch of the comb-teeth electrode 11 means the total width of a pair of a linear electrode 11E and a slit 11S. The extension direction 11A of the comb-teeth electrode 11 means a direction in which the linear electrodes 11E extend. A comb-teeth electrode herein includes a main electrode extending in a first direction and linear electrodes extending from the main electrode in a second direction different from the first direction. In drawings including FIG. 1 to FIG. 4, the structure of the main electrode of the comb-teeth electrode is omitted, and only the linear electrodes are depicted.

The present embodiment employs as the comb-teeth electrode 11 an in-plane switching (IPS) electrode in which band-like common electrodes and band-like pixel electrodes alternate. The structure of the comb-teeth electrode 11 is not limited thereto. For example, a fringe field switching (FFS) electrode is also suitably used. The FFS electrode includes, for example, pixel electrodes with slits on a planar common electrode via an insulating film. The FFS electrode may also include a common electrode with slits, via an insulating film, on planar pixel electrodes formed to occupy the respective pixel regions. The comb-teeth electrode 11 of the present embodiment is preferably an IPS electrode. This structure can increase the transmittance and the degree of circular polarization.

Herein, a state with voltage not lower than the threshold voltage applied between a common electrode and a pixel electrode in a pair is also simply referred to as "with voltage applied" or "during voltage application". A state with no voltage applied between a common electrode and a pixel electrode in a pair (including application of voltage lower than the threshold voltage) is also simply referred to as "with no voltage applied" or "during no voltage application".

In the present embodiment, the comb-teeth electrode 11 is disposed only in either the first substrate 100 or the second substrate 200. This configuration can simplify the structure of the liquid crystal element 10, improving the productivity. If the comb-teeth electrode 11 is disposed in both the first substrate 100 and the second substrate 200, moire would easily occur. The present embodiment can address the issue of moire and improve the in-plane uniformity of the optical properties.

The ratio of the electrode width to the slit width ((electrode width):(slit width)) of the comb-teeth electrode 11 is preferably from 1:2 to 1:6. This configuration can further improve the alignment uniformity, thus improving the degree of polarization of the emission light. The ratio of the electrode width to the slit width ((electrode width):(slit width)) of the comb-teeth electrode 11 is more preferably from 1:2.5 to 1:5. The ratio of the electrode width to the slit width ((electrode width):(slit width)) of the comb-teeth electrode 11 is still more preferably from 1:3 to 1:4.

The ratio of the thickness of the liquid crystal layer 300 to the slit width of the comb-teeth electrode 11 ((thickness of liquid crystal layer):(slit width)) is preferably from 1:2.5 to 1:10. This configuration can further improve the alignment uniformity, thus improving the degree of polarization of the emission light. The ratio of the thickness of the liquid crystal layer 300 to the slit width of the comb-teeth electrode 11 ((thickness of liquid crystal layer):(slit width)) is more preferably from 1:3 to 1:8. The ratio of the thickness of the liquid crystal layer 300 to the slit width of the comb-teeth electrode 11 ((thickness of liquid crystal layer):(slit width)) is still more preferably from 1:4 to 1:6.

The comb-teeth electrode 11 includes a pixel electrode that is a comb-teeth electrode and a common electrode that is a comb-teeth electrode. The pixel electrode and the common electrode can be formed by forming a single- or multi-layered film of a transparent conductive material such as indium tin oxide (ITO), indium zinc oxide (IZO), zinc oxide (ZnO), or tin oxide (SnO), or an alloy of any of these materials by sputtering or any other method, followed by patterning of the film by photolithography or any other method.

The azimuthal angle of the extension direction 11A of the comb-teeth electrode 11 is preferably, for example, 115° or greater and 155° or smaller. This configuration enables the modulation state during no voltage application or during low-frequency voltage application and enables the no modulation state during high-frequency voltage application.

Also, the azimuthal angle of the extension direction 11A of the comb-teeth electrode 11 is preferably, for example, 25° or greater and 65° or smaller. This configuration enables the no modulation state during no voltage application or during low-frequency voltage application and enables the modulation state during high-frequency voltage application.

As shown in FIG. 3 and FIG. 4, the comb-teeth electrode 11 is disposed to enable switching between a first state and a second state by application of voltage to the liquid crystal layer 300. The first state aligns the dual-frequency liquid crystal molecules 311 near the first substrate 100 in a first alignment direction 311A. The second state aligns the dual-frequency liquid crystal molecules 311 near the first substrate 100 in a second alignment direction 311B orthogonal to the first alignment direction 311A in a plan view.

The switching between the first state and the second state controls the polarization state of light incident on the liquid crystal cell 11C. Circularly polarized light incident on the liquid crystal cell 11C is converted to first linearly polarized light in the first state, while in the second state, converted to second linearly polarized light whose polarization direction is orthogonal to a polarization direction of the first linearly polarized light in a plan view. Linearly polarized light incident on the liquid crystal cell 11C is converted to first circularly polarized light in the first state while converted to second circularly polarized light whose rotation direction is reverse to a rotation direction of the first circularly polarized light in the second state. This configuration enables switching in a broad bandwidth between a state where circularly polarized light incident on the liquid crystal element 10 is emitted without any modulation and a state where circularly polarized light incident on the liquid crystal element 10 is emitted after being modulated, while controlling the thickness of the liquid crystal element 10. In other words, the present embodiment can achieve a liquid crystal element 10 which can switch between polarization modulation and no polarization modulation in a broad bandwidth and has a thin profile.

In the liquid crystal element 10 of the present embodiment including the liquid crystal cell 11C and the later-described retardation film 500, the first state is the polarization modulation state where the polarization states of left- and right-handed circularly polarized lights are converted, and the second state is the no polarization modulation state where the polarization states of left- and right-handed circularly polarized lights are not converted. Here, the alignment direction of dual-frequency liquid crystal molecules near the first substrate means the alignment direction of dual-frequency liquid crystal molecules located at the first substrate side interface of the liquid crystal layer. Similarly, the alignment direction of dual-frequency liquid crystal molecules near the second substrate means the alignment direction of dual-frequency liquid crystal molecules located at the second substrate side interface of the liquid crystal layer.

The alignment direction of dual-frequency liquid crystal molecules near the first substrate and the alignment direction of dual-frequency liquid crystal molecules near the second substrate can each be determined from a Mueller matrix output from Axoscan (available from Axometrics, Inc.) as a result of measurement on the liquid crystal cell. Also, the software for fitting the liquid crystal cell thickness or the liquid crystal twist angle in Axoscan can be used to determine the alignment direction of dual-frequency liquid crystal molecules near the first substrate and the alignment direction of dual-frequency liquid crystal molecules near the second substrate.

The liquid crystal layer 300 contains the dual-frequency liquid crystal molecules 310. This configuration enables switching between two liquid crystal alignment states (i.e., modulation state and no modulation state) by the comb-teeth electrode 11 disposed only in one of the substrates. Also, in the liquid crystal layer 300 containing the dual-frequency liquid crystal molecules 310, the alignment stability can be improved by voltage-applied realignment treatment even in a state where the liquid crystal layer 300 is sandwiched between two weak anchoring alignment films (in the present embodiment, the first weak anchoring horizontal alignment film 411 and the second weak anchoring horizontal alignment film 421). If common liquid crystal molecules were used, the alignment stabilization itself would be possible, but switching between the modulation state and the no modulation state would be impossible using only the comb-teeth electrode disposed in one of the substrates.

The dual frequency liquid crystal molecules 310 behave as positive liquid crystal molecules having a positive anisotropy of dielectric constant ($\Delta\varepsilon$) with low-frequency voltage applied while behaving as negative liquid crystal molecules having a negative $\Delta\varepsilon$ with high-frequency voltage applied. A single compound may behave as described above or a mixture of multiple compounds may behave as described above. In either case, liquid crystal molecules herein are called dual-frequency liquid crystal molecules.

Dual frequency liquid crystal molecules, without comb-teeth electrodes at different angles in the upper and lower substrates (the first substrate 100 and the second substrate 200), can be aligned in the direction perpendicular to the comb-teeth electrode extension direction by low-frequency driving of one comb-teeth electrode and aligned in the comb-teeth electrode extension direction by high-frequency driving of one comb-teeth electrode. This simplifies the electrode structure. $\Delta\varepsilon$ is expressed by the following (Formula L).

$$\Delta\varepsilon = \text{(dielectric constant in long axis direction of liquid crystal molecules)} - \text{(dielectric constant in short axis direction of liquid crystal molecules)} \quad \text{(Formula L)}$$

In the present embodiment, a low frequency is, for example, 1 Hz or higher and 1 kHz or lower, and a high frequency is 10 kHz or higher and 1 MHz or lower. The frequency at which the sign of $\Delta\varepsilon$ reverses is called crossover frequency, and can be adjusted as appropriate depending on the molecular structure of the liquid crystal material, the mixing ratio of the mixture, and other conditions.

The dual-frequency liquid crystal molecules 310 are twist-aligned between the first substrate 100 and the second substrate 200. In each of the first state and the second state, the dual-frequency liquid crystal molecules 310 are twist-aligned from the first substrate 100 toward the second substrate 200. The direction in which the dual-frequency liquid crystal molecules 310 are twisted in the first state is the same as the direction in which the dual-frequency liquid crystal molecules 310 are twisted in the second state. This configuration can achieve a favorable polarization modulation property in both of the two states (no modulation state and modulation state).

The direction of twist of the dual-frequency liquid crystal molecules 310 with voltage applied and the direction of twist of the dual-frequency liquid crystal molecules 310 with no voltage applied are the same as each other. For example, when the direction of twist with voltage applied is clockwise, the direction of twist with no voltage applied is also clockwise, and when the direction of twist with voltage applied is counterclockwise, the direction of twist with no voltage applied is also counterclockwise.

The twisted alignment of the dual-frequency liquid crystal molecules 310 is achieved by, for example, adding a chiral dopant to a liquid crystal material. The chiral dopant may be any known one. Examples of the chiral dopant include S-811 (available from Merck KGaA).

The angle formed between the alignment direction (first alignment direction) 311A of the dual-frequency liquid crystal molecules 311 near the first substrate 100 and the alignment direction 312A of the dual-frequency liquid crystal molecules 312 near the second substrate 200 in a plan view in the first state is preferably 57° or greater and 82° or smaller, more preferably 63° or greater and 75° or smaller, still more preferably 66° or greater and 72° or smaller. This configuration enables switching between polarization modulation and no polarization modulation in a broader bandwidth. Hereinafter, an angle formed between the alignment direction of dual-frequency liquid crystal molecules near the first substrate and the alignment direction of dual-frequency liquid crystal molecules near the second substrate in a plan view is also referred to as an angle of twist.

The angle formed between the alignment direction (second alignment direction) 311B of the dual-frequency liquid crystal molecules 311 near the first substrate 100 and the alignment direction 312B of the dual-frequency liquid crystal molecules 312 near the second substrate 200 in a plan view in the second state is preferably 57° or greater and 82° or smaller, more preferably 63° or greater and 75° or smaller, still more preferably 66° or greater and 72° or smaller. This configuration enables effective switching between polarization modulation and no polarization modulation in a broad bandwidth. The angle of twist in the first state and the angle of twist in the second state may be the same as or different from each other, and are preferably the same as each other.

The angle of twist during no voltage application is preferably 67° or greater and 92° or smaller, more preferably 73° or greater and 85° or smaller, still more preferably 76° or greater and 82° or smaller. The voltage application causes a decrease in angle of twist. Thus, setting the angle of twist during no voltage application as described above can bring the angles of twist in both the first state and the second state within the suitable ranges, thus enabling effective switching between polarization modulation and no polarization modulation in a broad bandwidth.

The alignment direction of the dual-frequency liquid crystal molecules 310 located in the center of the liquid crystal layer 300 in the thickness direction is also referred to as a liquid crystal average alignment direction. The liquid crystal average alignment direction is set between the alignment direction of the dual-frequency liquid crystal molecules 311 near the first substrate 100 and the alignment direction of the dual-frequency liquid crystal molecules 312 near the second substrate 200.

As shown in FIG. 3 and FIG. 4, during no voltage application to the comb-teeth electrode 11 (also referred to as "with the voltage off"), the alignment direction (liquid crystal average alignment direction) 310A of the dual-frequency liquid crystal molecules 310 in the center of the liquid crystal layer 300 in the thickness direction is orthogonal to the extension direction 11A of the comb-teeth electrode 11. For example, when liquid crystal realignment is performed with low-frequency voltage applied in production of the liquid crystal element 10, the alignment direction of the dual-frequency liquid crystal molecules 310 located in the center of the liquid crystal layer 300 in the thickness direction with no voltage applied is orthogonal to the extension direction 11A of the comb-teeth electrode 11. The voltage applied in this case needs to be lower than the crossover frequency of the dual-frequency liquid crystal molecules 310. For example, the voltage is preferably 1 V or higher and 10 V or lower at 1 Hz or higher and 1 kHz or lower. This process enables uniform alignment in the state where the liquid crystal average alignment direction 310A of the dual-frequency liquid crystal molecules 310 during no voltage application to the comb-teeth electrode 11 is orthogonal to the extension direction 11A of the comb-teeth electrode 11.

In the present embodiment, a focus is placed on the relationship between the liquid crystal average alignment direction 310A and the extension direction 11A of the comb-teeth electrode 11, not on the alignment directions of the dual-frequency liquid crystal molecules 311 near the first substrate 100 and the dual-frequency liquid crystal molecules 312 near the second substrate 200. This is because dual-frequency liquid crystal molecules 310 in regions apart from the substrates (also referred to as bulk dual-frequency liquid crystal molecules) are more likely to be influenced by the extension direction 11A of the comb-teeth electrode 11 (direction of the electric field E) than dual-frequency liquid crystal molecules 311 near the first substrate 100 and dual-frequency liquid crystal molecules 312 near the second substrate 200 are.

For example, when the angle of twist is set not at 70° but at 65°, the alignment directions of dual-frequency liquid crystal molecules 311 near the first substrate 100 and dual-frequency liquid crystal molecules 312 near the second substrate 200 change to reduce the angle formed between the alignment direction of the dual-frequency liquid crystal molecules 311 near the first substrate 100 and the alignment direction of the dual-frequency liquid crystal molecules 312 near the second substrate 200. Yet, the liquid crystal average alignment direction does not change. Changes in concentration of the chiral dopant added to the liquid crystal material cause similar changes, but the liquid crystal average alignment direction does not change. Thus, in the present embodiment, a focus is placed on the liquid crystal average alignment direction 310A, not on the alignment direction of the dual-frequency liquid crystal molecules 311 near the first substrate 100 and the alignment direction of the dual-frequency liquid crystal molecules 312 near the second substrate 200.

The material of the weak anchoring horizontal alignment films is not limited and can be a known one (see paragraphs 0095 to 0101 in Japanese Patent Application No. 2022-065194). The material also preferably includes two or more polymers for improvement of reliability and productivity. In addition, for improvement of panel strength (seal adhesion), a material having a polymerizable moiety that chemically binds to a sealant is also desirably used.

The first weak anchoring horizontal alignment film 411 preferably has an azimuthal angle anchoring energy of less than $1 \times 10^{-4}$ J/m$^2$. This configuration can further improve the polarization modulation property. The second weak anchoring horizontal alignment film 421 preferably has an azimuthal angle anchoring energy of less than $1 \times 10^{-4}$ J/m$^2$. This configuration can further improve the polarization modulation property.

The azimuthal anchoring energy can be calculated by any of various known methods such as the torque balance method, the Neel wall method, a method of calculation from an electric field response threshold, or a method of calculation from a rotating magnetic field. The azimuthal anchoring energy herein is calculated by the method of calculation from an electric field response threshold. The lower limit of the azimuthal anchoring energy of the weak anchoring alignment film is not limited. The azimuthal anchoring energy of the weak anchoring alignment film is, for example, $1 \times 10^{-10}$ J/m$^2$ or more.

The azimuthal angle anchoring energy of the first weak anchoring horizontal alignment film 411 is preferably $1 \times 10^{-10}$ J/m$^2$ or more and less than $1 \times 10^{-4}$ J/m$^2$, more preferably $1 \times 10^{-8}$ J/m$^2$ or more and $1 \times 10^{-5}$ J/m$^2$ or less. This configuration enables effective switching between polarization modulation and no polarization modulation in a broad bandwidth.

The azimuthal angle anchoring energy of the second weak anchoring horizontal alignment film 421 is preferably $1 \times 10^{-10}$ J/m$^2$ or more and less than $1 \times 10^{-4}$ J/m$^2$, more preferably $1 \times 10^{-8}$ J/m$^2$ or more and $1 \times 10^{-5}$ J/m$^2$ or less. This configuration enables effective switching between polarization modulation and no polarization modulation in a broad bandwidth.

The ratio of the azimuthal angle anchoring energy of the second weak anchoring horizontal alignment film 421 to the azimuthal angle anchoring energy of the first weak anchoring horizontal alignment film 411 (i.e., (azimuthal angle anchoring energy of second weak anchoring horizontal alignment film 421)/(azimuthal angle anchoring energy of first weak anchoring horizontal alignment film 411)) is preferably 10 or less. This configuration can further improve the alignment stability. The ratio of the azimuthal angle anchoring energy of the second weak anchoring horizontal alignment film 421 to the azimuthal angle anchoring energy of the first weak anchoring horizontal alignment film 411 is more preferably 8 or less, still more preferably 6 or less.

The ratio of the azimuthal angle anchoring energy of the second weak anchoring horizontal alignment film 421 to the azimuthal angle anchoring energy of the first weak anchoring horizontal alignment film 411 is, for example, preferably 0.1 or more, more preferably 0.3 or more, still more preferably 0.5 or more.

The ratio of the azimuthal angle anchoring energy of the second weak anchoring horizontal alignment film 421 to the azimuthal angle anchoring energy of the first weak anchoring horizontal alignment film 411 is preferably 0.1 or more and 10 or less, more preferably 0.3 or more and 8 or less, still more preferably 0.5 or more and 6 or less.

The weak anchoring alignment films can be formed by alignment treatment or without alignment treatment. Specifically, the weak anchoring alignment films may each be a rubbed alignment film, a photo-alignment film, or an untreated alignment film having undergone no alignment treatment.

The first weak anchoring horizontal alignment film 411 and the second weak anchoring horizontal alignment film 421 are preferably untreated alignment films having undergone no alignment treatment. In other words, the first weak anchoring horizontal alignment film 411 and the second weak anchoring horizontal alignment film 421 preferably do not exhibit uniaxial alignment. This configuration can further improve the alignment stability.

The first weak anchoring horizontal alignment film 411 and the second weak anchoring horizontal alignment film 421 preferably introduce an in-plane retardation Re of less than 1 nm. This configuration can further improve the alignment stability.

An untreated alignment film may be obtained by, for example, forming on a substrate a film of an alignment film material containing a polymer for an alignment film. Examples of the polymer for an alignment film include polyimide and polyhexyl methacrylate. The polymer for an alignment film contained in the untreated alignment film may be one kind or two kinds or more.

Examples of the polymer for an alignment film contained in the untreated alignment film include polymers described in WO 2017/034023 as well as polyimide and polyhexyl methacrylate. Particularly preferred are polyalkylene oxides such as polyethylene glycol and polypropylene glycol.

A horizontal alignment film has a function of aligning dual-frequency liquid crystal molecules in the liquid crystal layer horizontally to its surface during no voltage application. The expression that a horizontal alignment film aligns dual-frequency liquid crystal molecules horizontally to its surface means that the pre-tilt angle of the dual-frequency liquid crystal molecules is 0° or greater and 5° or smaller, preferably 0° or greater and 2° or smaller, more preferably 0° or greater and 1° or smaller, from the surface of the horizontal alignment film. The pre-tilt angle of dual-frequency liquid crystal molecules means the angle of inclination of the long axes of the dual-frequency liquid crystal molecules from the main surfaces of the alignment film during no voltage application to the liquid crystal layer.

The first weak anchoring horizontal alignment film 411 preferably contains a polymer having at least one group selected from a group represented by the following structural formula (P1) and a group represented by the following structural formula (P2). This configuration can further improve the alignment stability.

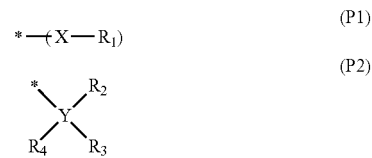

In the structural formulas, X includes at least one group selected from an ether group, an ester group, and an amide group; $R_1$, $R_2$, $R_3$, and $R_4$ each independently represent a hydrocarbon group; and Y represents a carbon atom or a silicon atom.

The second weak anchoring horizontal alignment film 421 preferably contains a polymer having at least one group selected from a group represented by the structural formula (P1) and a group represented by the structural formula (P2). This configuration can further improve the polarization modulation property and the alignment stability.

The first weak anchoring horizontal alignment film 411 and the second weak anchoring horizontal alignment film 421 each preferably contain a polymer having at least one group selected from a group represented by the structural formula (P1) and a group represented by the structural formula (P2). This configuration can further improve the polarization modulation property and the alignment stability. The structure of the polymer contained in the first weak anchoring horizontal alignment film 411 and the structure of the polymer contained in the second weak anchoring horizontal alignment film 421 may be the same as or different from each other. These structures are more preferably the same as each other because the anchoring energy of the first weak anchoring film and that of the second weak anchoring film can be made the same. The structures are preferably the same as each other also in terms of the productivity.

Light incident on the liquid crystal element 10 is preferably circularly polarized light. This configuration enables a liquid crystal element 10 capable of switching the polarization states of circularly polarized light.

Figure 5:
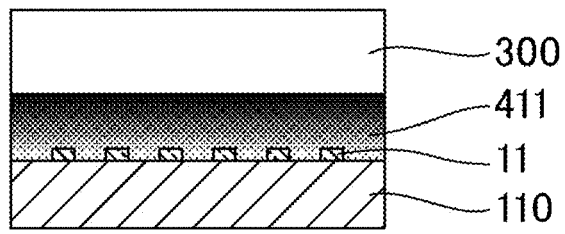
FIG. 5 is a schematic cross-sectional view showing an example of a weak anchoring alignment film in the liquid crystal element of Embodiment 1.

FIG. 5 is a schematic cross-sectional view showing an example of a weak anchoring alignment film in the liquid crystal element of Embodiment 1. Preferably, at least one horizontal alignment film selected from the first weak anchoring horizontal alignment film 411 and the second weak anchoring horizontal alignment film 421 (in the present embodiment, the first weak anchoring horizontal alignment film 411) is in contact with the comb-teeth electrode 11 and contains at least two polymers different in refractive index from each other, and a polymer having a smallest refractive index among the at least two polymers is in contact with the liquid crystal layer 300.

Having a large refractive index compared to glass substrates (first supporting substrate 110 and second supporting substrate 210) and the liquid crystal layer 300, the transparent electrode (comb-teeth electrode 11) produces large optical loss due to unnecessary diffraction, haze, unnecessary reflection, and other factors. Yet, the difference in refractive index between the layers can be reduced and thus the optical loss can be reduced by adjusting the refractive index of an alignment film material and then applying the material to the surface of the transparent electrode (comb-teeth electrode 11). In other words, the difference in refractive index between the layers can be reduced and thus the optical loss can be reduced by a structure in which at least one horizontal alignment film selected from the first weak anchoring horizontal alignment film 411 and the second weak anchoring horizontal alignment film 421 (in the present embodiment, the first weak anchoring horizontal alignment film 411) is in contact with the comb-teeth electrode 11 and contains at least two polymers different in refractive index from each other, and a polymer having a smallest refractive index among the at least two polymers is in contact with the liquid crystal layer 300.

The liquid crystal element 10 of the present embodiment, as shown in FIG. 1, includes a retardation film 500 disposed on at least one of the side of the first substrate 100 opposite to the liquid crystal layer 300 or the side of the second substrate 200 opposite to the liquid crystal layer 300. The retardation films 500 may be disposed on both the side of the first substrate 100 opposite to the liquid crystal layer 300 and the side of the second substrate 200 opposite to the liquid crystal layer 300. Yet, preferably, the retardation film 500 is disposed on one of these sides. This configuration can improve the productivity of the liquid crystal element 10.

The retardation film 500 is disposed on the side of the first substrate 100 opposite to the liquid crystal layer 300 or the side of the second substrate 200 opposite to the liquid crystal layer 300. The retardation film 500 includes, in order from the side closer to the liquid crystal layer 300, a first quarter-wave film 12 and a second quarter-wave film 13. This configuration enables switching between polarization modulation and no polarization modulation in a broader bandwidth. The following describes a case where the liquid crystal element 10 includes, in order from the light incident side toward the light emitting side, the liquid crystal cell 11C, the first quarter-wave film 12, and the second quarter-wave film 13.

During no voltage application to the comb-teeth electrode 11 or during driving at a frequency lower than the crossover frequency of the dual-frequency liquid crystal molecules 310 (also referred to as during low-frequency driving), circularly polarized light (e.g., right-handed circularly polarized light) incident on the liquid crystal cell 11C becomes first linearly polarized light after passing through the liquid crystal cell 11C. In addition, the first linearly polarized light, after passing through the first quarter-wave film 12 and the second quarter-wave film 13, is converted in a broad bandwidth to circularly polarized light in a different polarization state (for example, left-handed circularly polarized light) from the circularly polarized light incident on the liquid crystal cell 11C. In this manner, the first state achieves polarization modulation in a broad bandwidth where circularly polarized light incident on the liquid crystal element 10 is emitted after being converted to circularly polarized light in a different polarization state (for example, right-handed circularly polarized light to left-handed circularly polarized light).

The above configuration, with voltage applied to the comb-teeth electrode 11, causes circularly polarized light (for example, right-handed circularly polarized light) incident on the liquid crystal cell 11C to be second linearly polarized light whose polarization direction is perpendicular to the polarization direction of the first linearly polarized light in a plan view after passing through the liquid crystal cell 11C. In other words, the second state is achieved. In addition, the second linearly polarized light, after passing through the first quarter-wave film 12 and the second quarter-wave film 13, is emitted in a broad bandwidth as circularly polarized light in the same polarization state (for example, right-handed circularly polarized light) as the circularly polarized light incident on the liquid crystal cell 11C. In this manner, the second state achieves in a broad bandwidth no polarization modulation where circularly polarized light incident on the liquid crystal element 10 is emitted in the same polarization state (for example, while remaining as right-handed circularly polarized light).

In the present embodiment, the case is described where the liquid crystal element 10 includes, in order from the light incident side toward the light emitting side, the liquid crystal cell 11C, the first quarter-wave film 12, and the second quarter-wave film 13. This stacking order may be reversed. Specifically, the liquid crystal element 10 may include, in order from the light incident side toward the light emitting side, the second quarter-wave film 13, the first quarter-wave film 12, and the liquid crystal cell 11C. Also with this configuration, the first state achieves polarization modulation where circularly polarized light incident on the liquid crystal element 10 is emitted after converted to circularly polarized light in a different polarization state (for example, right-handed circularly polarized light is converted to left-handed circularly polarized light) in a broad bandwidth, while the second state achieves no polarization modulation where circularly polarized light incident on the liquid crystal element 10 is emitted in the same polarization state (for example, while remaining as right-handed circularly polarized light) in a broad bandwidth. Reversal of the stacking order requires appropriate adjustment of the slow axis 12A of the first quarter-wave film 12 and the slow axis 13A of the second quarter-wave film 13.

Figure 6:
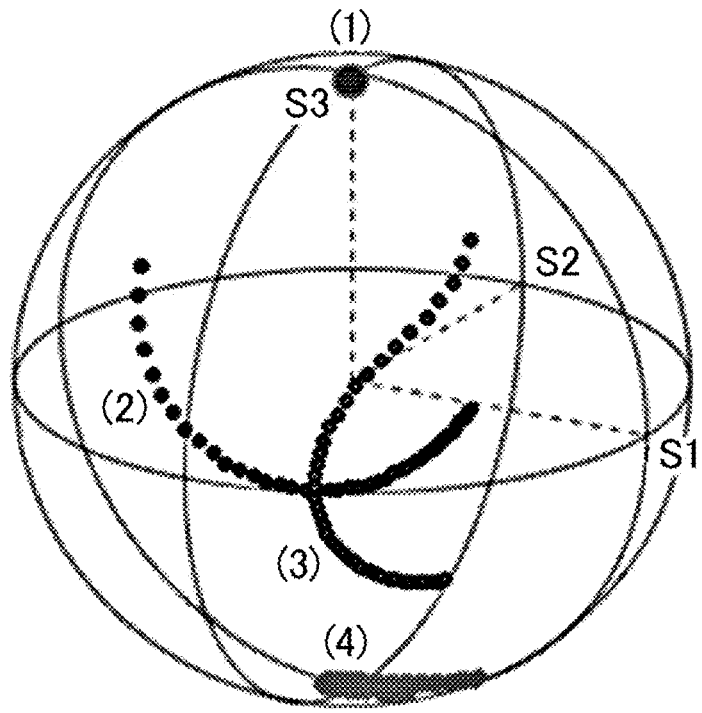
FIG. 6 shows a Poincare sphere with Stokes parameters on which the polarization states of light converted by layers in the first state in the liquid crystal element of Embodiment 1 are plotted.

FIG. 6 shows a Poincare sphere with Stokes parameters on which the polarization states of light converted by layers in the first state in the liquid crystal element of Embodiment 1 are plotted. FIG. 6 shows the polarization state of light when the light passes through each layer (i.e., the function of each layer) in the first state. The principle of the polarization modulation in the liquid crystal element 10 of Embodiment 1 is described in detail using the Poincaré sphere in FIG. 6.

As shown by the plotted point (1) in FIG. 6, right-handed circularly polarized light (S3=+1) is incident on the liquid crystal cell 11C.

After passing through the liquid crystal cell 11C with 70°-twisted alignment, the right-handed circularly polarized light is once converted to the polarization state as shown by one of the plotted points (2) in FIG. 6. The plotted points indicate lights at different wavelengths of 380 nm to 780 nm. Lights at wavelengths of around 550 nm were plotted as linearly polarized lights (appeared on the equator of the Poincaré sphere), whereas lights at the other wavelengths are plotted on the Northern hemisphere of the Poincaré sphere as elliptically polarized lights.

The light then passes through the first quarter-wave film 12 (specifically, the quarter-wave film exhibiting reverse wavelength dispersion), plotted as one of the points (3) in FIG. 6.

The light then passes through the second quarter-wave film 13 (specifically, the quarter-wave film exhibiting flat wavelength dispersion). Lights at almost all the wavelengths are then emitted as left-handed circularly polarized lights (appeared on or near the south pole of the Poincaré sphere) as shown by the plotted points (4) in FIG. 6. This means that right-handed circularly polarized light was modulated to left-handed circularly polarized light.

Similarly, in the second state (during no modulation), the right-handed circularly polarized light is once converted to linearly polarized light after passing through the liquid crystal cell 11C with 70°-twisted alignment. The linearly polarized light is different in angle by about 90° from the linearly polarized light in the first state (during modulation) since the entire alignment of the liquid crystal cell 11C is rotated by 90°. Thereafter, lights at all the wavelengths are converted to right-handed circularly polarized light after passing through the first quarter-wave film 12 and the second quarter-wave film 13. In other words, right-handed circularly polarized light can be emitted as right-handed circularly polarized light with no modulation.

As described above, the first state and the second state are the same in the 70°-twisted alignment of the dual-frequency liquid crystal molecules 310 and different in the entire system by 90°. The liquid crystal element 10 of the present embodiment enables reversible switching between the two states of the first state and the second state, enabling a thin switchable half wave plate (sHWP) element achieving both no polarization modulation and polarization modulation in a broad bandwidth. The modulation state can be designed to be achieved in one of the driving modes and the no modulation state in the other. This design can be altered by changing the arrangement of the retardation films (first quarter-wave film 12 and second quarter-wave film 13) and the substrates.

The retardation film 500 is, for example, a quarter-wave film. The quarter-wave films (specifically, the first quarter-wave film 12 and the second quarter-wave film 13) may be any films introducing an in-plane retardation of 20 nm or more and 240 nm or less to at least light having a wavelength of 550 nm.

The quarter-wave films are made of, for example, a photopolymerizable liquid crystal material. The photopolymerizable liquid crystal material has a skeletal molecular structure terminated with a photopolymerizable group such as an acrylate group or a methacrylate group, for example.

The quarter-wave films can each be formed by the following method, for example. First, a photopolymerizable liquid crystal material is dissolved in an organic solvent such as propylene glycol monomethyl ether acetate (PGMEA). Then, the obtained solution is applied to a surface of a base material (for example, polyethylene terephthalate (PET) film) to form a film of the solution. The film of the solution is successively pre-baked, irradiated with light (for example, ultraviolet light), and post-baked, so that a quarter-wave film is formed.

Also, the quarter-wave films may each be a liquid crystal polymer film formed by polymerizing a mixture of the photopolymerizable liquid crystal material and a chiral dopant in a 70°-twisted state.

The quarter-wave films also can each be a stretched polymer film, for example. The polymer film is made of, for example, a cycloolefin polymer, polycarbonate, polysulfone, polyethersulfone, polyethylene terephthalate, polyethylene, polyvinyl alcohol, norbornene, triacetyl cellulose, or diacetyl cellulose.

The first quarter-wave film 12 preferably exhibits reverse wavelength dispersion. This configuration enables switching between polarization modulation and no polarization modulation in a broader bandwidth. Herein, the "wavelength dispersion" of a retardation film means the correlation between the absolute value of a retardation introduced by the retardation film and the wavelength of incident light. The retardation dispersion where the absolute value of the retardation introduced by a retardation film is constant regardless of the wavelength of incident light in the visible spectrum is also referred to as "flat wavelength dispersion". The retardation dispersion where the absolute value of the retardation introduced by a retardation film decreases as the wavelength of incident light becomes longer in the visible spectrum is also referred to as "positive wavelength dispersion". The retardation dispersion where the absolute value of the retardation introduced by a retardation film increases as the wavelength of incident light becomes longer in the visible spectrum is also referred to as "reverse wavelength dispersion".

Preferably, the in-plane retardation introduced by the first quarter-wave film 12 at a wavelength of 450 nm is 0.7 times or more and 1 times or less the in-plane retardation introduced by the first quarter-wave film 12 at a wavelength of 550 nm. This configuration enables switching between polarization modulation and no polarization modulation in a broader bandwidth.

Preferably, the in-plane retardation introduced by the first quarter-wave film 12 at a wavelength of 650 nm is 1 times or more and 1.3 times or less the in-plane retardation introduced by the first quarter-wave film 12 at a wavelength of 550 nm. This configuration enables switching between polarization modulation and no polarization modulation in a broader bandwidth.

Preferably, the in-plane retardation introduced by the first quarter-wave film 12 at a wavelength of 550 nm is 30 nm or more and 230 nm or less. This configuration enables switching between polarization modulation and no polarization modulation in a broader bandwidth.

When the azimuthal angle of the alignment direction 311A of the dual-frequency liquid crystal molecules 311 near the first substrate 100 in the first state is taken as 0°, preferably, the slow axis of the first quarter-wave film 12 or the second quarter-wave film 13, whichever is farther from the light emitting side (in the present embodiment, the slow axis 12A of the first quarter-wave film 12), is at an azimuthal angle of 48° or greater and 66° or smaller. This configuration enables switching between polarization modulation and no polarization modulation in a broader bandwidth.

Preferably, the second quarter-wave film 13 exhibits flat wavelength dispersion. This configuration enables switching between polarization modulation and no polarization modulation in a broader bandwidth.

Preferably, the in-plane retardation introduced by the second quarter-wave film 13 at a wavelength of 550 nm is 110 nm or more and 175 nm or less. This configuration enables switching between polarization modulation and no polarization modulation in a broader bandwidth.

When the azimuthal angle of the alignment direction 311A of the dual-frequency liquid crystal molecules 311 near the first substrate 100 in the first state is taken as 0°, preferably, the slow axis of the first quarter-wave film 12 or the second quarter-wave film 13, whichever is closer to the light emitting side (in the present embodiment, the slow axis 13A of the second quarter-wave film 13), is at an azimuthal angle of 3° or greater and 22° or smaller. This configuration enables switching between polarization modulation and no polarization modulation in a broader bandwidth.

The angle formed between the slow axis 12A of the first quarter-wave film 12 and the slow axis 13A of the second quarter-wave film 13 is preferably 40° or greater and 50° or smaller, more preferably 42° or greater and 48° or smaller, still more preferably 44° or greater and 46° or smaller, particularly preferably 45°.

Modified Example 1 of Embodiment 1

Figure 7:
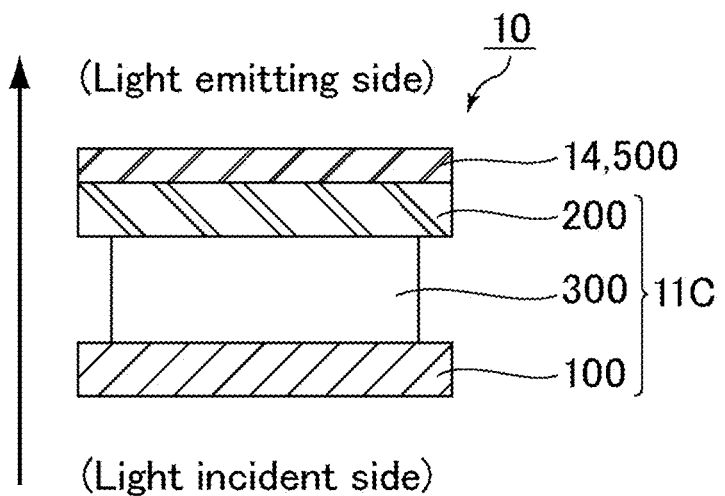
FIG. 7 is a schematic cross-sectional view of a liquid crystal element of Modified Example 1 of Embodiment 1.

FIG. 7 is a schematic cross-sectional view of a liquid crystal element of Modified Example 1 of Embodiment 1. The retardation film 500 in Embodiment 1 is composed of two quarter-wave films. Meanwhile, a retardation film 500 in the present modified example is composed of one quarter-wave film. Specifically, as shown in FIG. 7, the retardation film 500 in the present modified example is disposed on the side of the first substrate 100 opposite to the liquid crystal layer 300 or the side of the second substrate 200 opposite to the liquid crystal layer 300, and the retardation film 500 is a quarter-wave film 14. This configuration enables switching between polarization modulation and no polarization modulation in a broader bandwidth.

The quarter-wave film 14 preferably exhibits reverse wavelength dispersion. This configuration enables switching between polarization modulation and no polarization modulation in a broader bandwidth.

Preferably, the in-plane retardation introduced by the quarter-wave film 14 at a wavelength of 450 nm is 0.7 times or more and 1 times or less the in-plane retardation introduced by the quarter-wave film 14 at a wavelength of 550 nm. This configuration enables switching between polarization modulation and no polarization modulation in a broader bandwidth.

Preferably, the in-plane retardation introduced by the quarter-wave film 14 at a wavelength of 650 nm is 1 times or more and 1.3 times or less the in-plane retardation introduced by the quarter-wave film 14 at a wavelength of 550 nm. This configuration enables switching between polarization modulation and no polarization modulation in a broader bandwidth.

Preferably, the in-plane retardation introduced by the quarter-wave film 14 at a wavelength of 550 nm is 30 nm or more and 230 nm or less. This configuration enables switching between polarization modulation and no polarization modulation in a broader bandwidth.

When the alignment direction 311A of the dual-frequency liquid crystal molecules 311 near the first substrate 100 in the first state is at an azimuthal angle of 0°, the slow axis of the quarter-wave film 14 is preferably at an azimuthal angle of 2° or greater and 22° or smaller. This configuration enables switching between polarization modulation and no polarization modulation in a broader bandwidth.

Modified Example 2 of Embodiment 1

Figure 8:
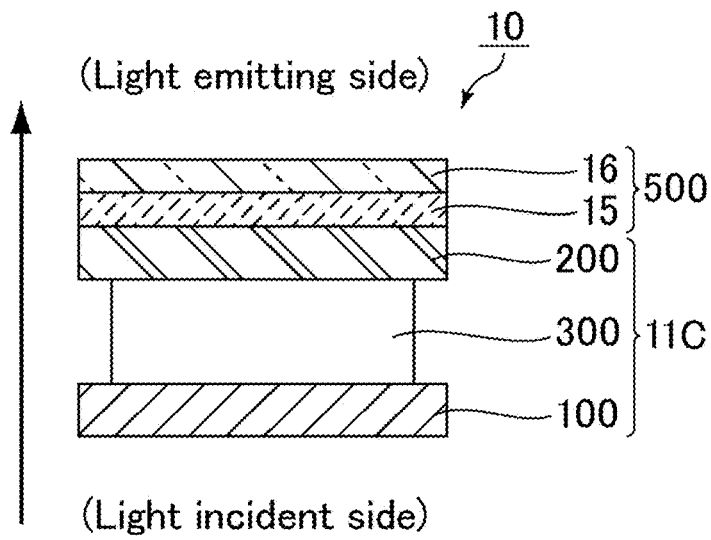
FIG. 8 is a schematic cross-sectional view of a liquid crystal element of Modified Example 2 of Embodiment 1.

FIG. 8 is a schematic cross-sectional view of a liquid crystal element of Modified Example 2 of Embodiment 1. The retardation film 500 in Embodiment 1 is composed of two quarter-wave films, namely the first quarter-wave film 12 and the second quarter-wave film 13. Meanwhile, a retardation film 500 in the present modified example is composed of a positive A plate and a negative A plate. Specifically, as shown in FIG. 8, the retardation film 500 in the present embodiment is disposed on the side of the first substrate 100 opposite to the liquid crystal layer 300 or the side of the second substrate 200 opposite to the liquid crystal layer 300, and the retardation film 500 includes, in order from the side closer to the liquid crystal layer 300, a positive A plate 15 and a negative A plate 16. This configuration enables switching between polarization modulation and no polarization modulation in a broader bandwidth. A configuration is described below in which the liquid crystal element 10 includes, in order from the light incident side toward the light emitting side, the liquid crystal cell 11C, the positive A plate 15, and the negative A plate 16.

The positive A plate 15 is a layer satisfying the relationship nx>ny=nz. Preferably, the in-plane retardation introduced by the positive A plate 15 at a wavelength of 550 nm is 30 nm or more and 230 nm or less. This configuration enables switching between polarization modulation and no polarization modulation in a broader bandwidth.

When the alignment direction 311A of the dual-frequency liquid crystal molecules 311 near the first substrate 100 is at an azimuthal angle of 0° in the first state, the slow axis of the positive A plate 15 or the negative A plate 16, whichever is farther from the light emitting side (in the present embodiment, the positive A plate 15), is preferably at an azimuthal angle of 43° or greater and 63° or smaller. This configuration enables switching between polarization modulation and no polarization modulation in a broader bandwidth.

The negative A plate 16 is a layer satisfying the relationship nz=nx>ny. Preferably, the in-plane retardation introduced by the negative A plate 16 at a wavelength of 550 nm is 30 nm or more and 230 nm or less. This configuration enables switching between polarization modulation and no polarization modulation in a broader bandwidth.

When the alignment direction 311A of the dual-frequency liquid crystal molecules 311 near the first substrate 100 is at an azimuthal angle of 0° in the first state, the slow axis of the positive A plate 15 or the negative A plate 16, whichever is closer to the light emitting side (in the present embodiment, negative A plate 16), is preferably at an azimuthal angle of greater than 0° and 20° or smaller. This configuration enables switching between polarization modulation and no polarization modulation in a broader bandwidth.

Modified Example 3 of Embodiment 1

Figure 9:
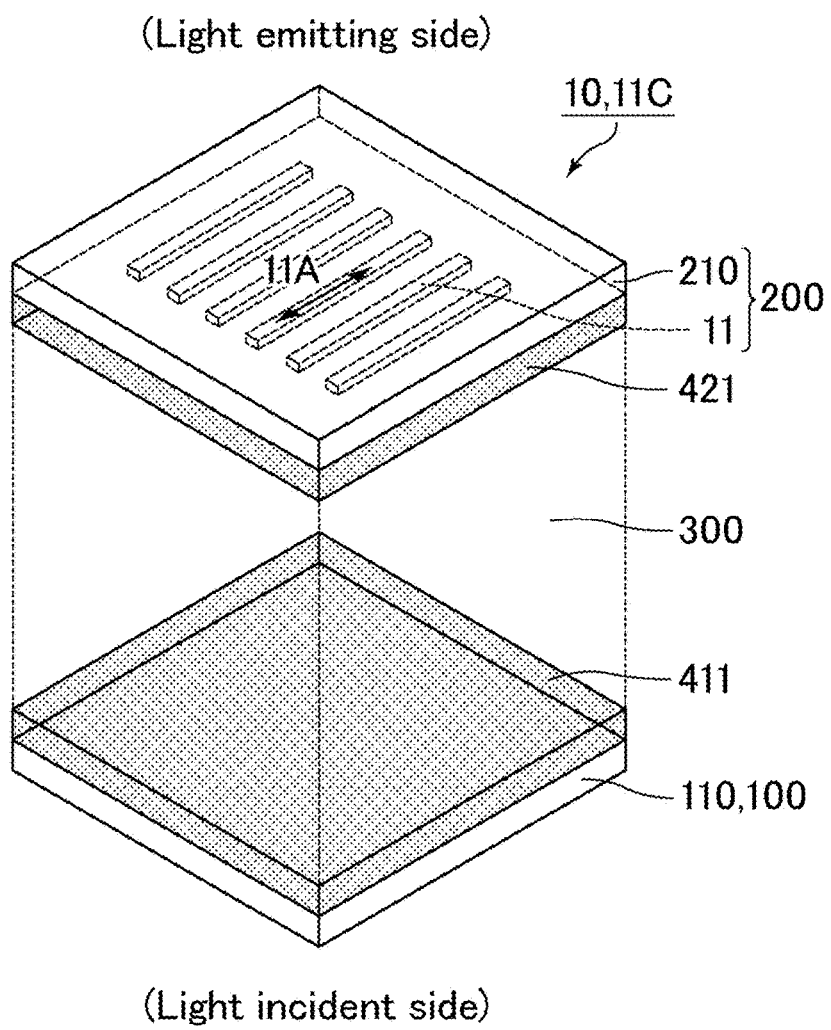
FIG. 9 is a schematic perspective view of a liquid crystal element of Modified Example 3 of Embodiment 1.
Figure 10:
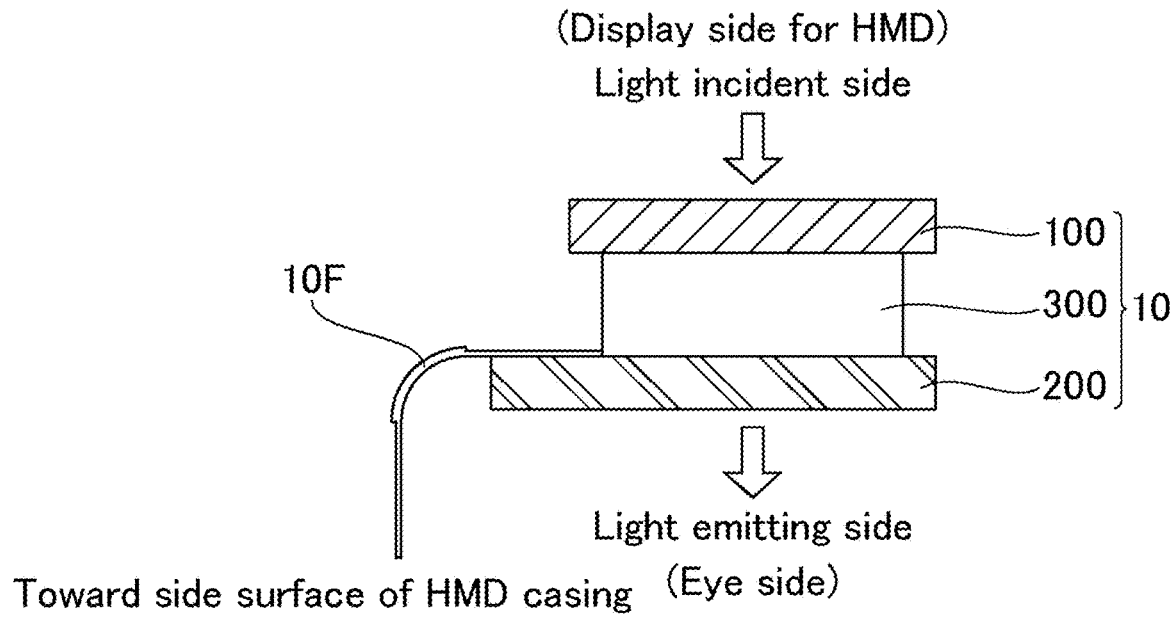
FIG. 10 is a schematic cross-sectional view of the liquid crystal element of Modified Example 3 of Embodiment 1.
Figure 11:
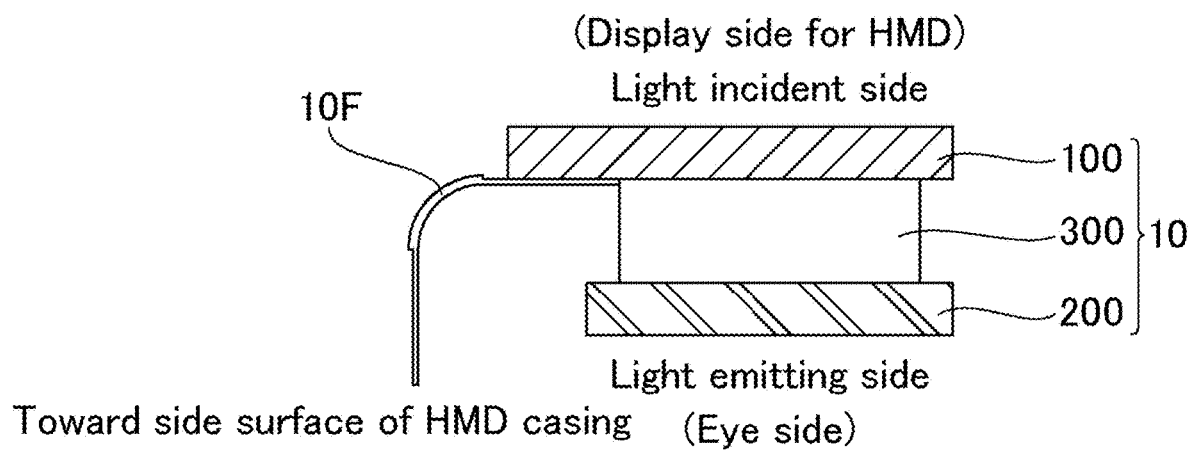
FIG. 11 is a schematic cross-sectional view of a varifocal element in which only the light incident side substrate includes an electrode.

FIG. 9 is a schematic perspective view of a liquid crystal element of Modified Example 3 of Embodiment 1. FIG. 10 is a schematic cross-sectional view of the liquid crystal element of Modified Example 3 of Embodiment 1. FIG. 11 is a schematic cross-sectional view of a varifocal element in which only the light incident side substrate includes an electrode.

In the liquid crystal element 10 of Embodiment 1, the first substrate 100 disposed on the light incident side includes the comb-teeth electrode 11, and the second substrate 200 disposed on the light emitting side includes no comb-teeth electrode. Meanwhile, in the liquid crystal element 10 of the present modified example, as shown in FIG. 9 and FIG. 10, the first substrate 100 disposed on the light incident side includes no comb-teeth electrode 11, and the second substrate 200 disposed on the light emitting side includes the comb-teeth electrode 11. This configuration can also improve the alignment stability.

As shown in FIG. 10, the first substrate 100 or the second substrate 200 in the liquid crystal element 10 of the present modified example includes a curved flexible printed circuit 10F, and the comb-teeth electrode 11 is disposed only in the first substrate 100 or the second substrate 200, whichever is located in the direction of curvature of the flexible printed circuit (FPC) 10F. Here, when the liquid crystal element 10 is driven, as shown in FIG. 10 and FIG. 11, the driving is performed by pressure-bonding the FPC 10F onto the liquid crystal element 10 and supplying voltage from an external circuit. For example, in the case of applying the present embodiment to a head mounted display (HMD), the FPC 10F needs to be bent to be housed in the casing of the headset. Since an HMD usually includes a circuitry in its temples, the FPC 10F is bent toward the light emitting side. Here, if electrodes are present on the light incident side, as shown in FIG. 11, the FPC 10F needs to be pressure-bonded to the light incident side substrate. In this case, the FPC 10F would easily suffer from peeling under the stress resulting from bending. Yet, the reliability of the device can be improved by employing a structure including the electrode substrate on the light emitting side such that the FPC 10F can be bent toward the light emitting side as in the present modified example employing the structure shown in FIG. 10.

The "direction of curvature of the FPC" means the direction in which the FPC is bent in a cross-sectional view of the liquid crystal element.

Modified Example 4 of Embodiment 1

Figure 12:
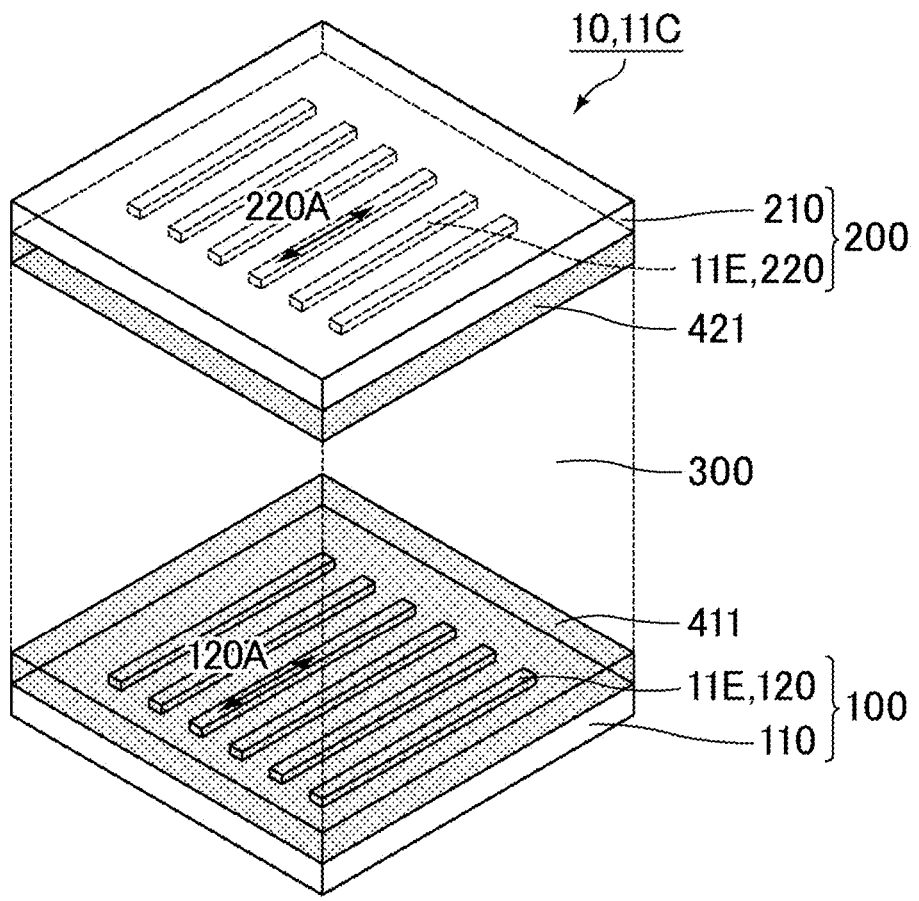
FIG. 12 is a schematic perspective view of a liquid crystal element of Modified Example 4 of Embodiment 1.

FIG. 12 is a schematic perspective view of a liquid crystal element of Modified Example 4 of Embodiment 1. The liquid crystal element 10 of Embodiment 1 includes the comb-teeth electrode 11 in only one of the substrates. Meanwhile, in the present modified example, as shown in FIG. 12, the comb-teeth electrode 11 includes a first substrate side comb-teeth electrode 120 disposed in the first substrate 100 and a second substrate side comb-teeth electrode 220 disposed in the second substrate 200. The extension direction 120A of the first substrate side comb-teeth electrode 120 is parallel to the extension direction 220A of the second substrate side comb-teeth electrode 220. This configuration can also improve the alignment stability.

Figure 13:
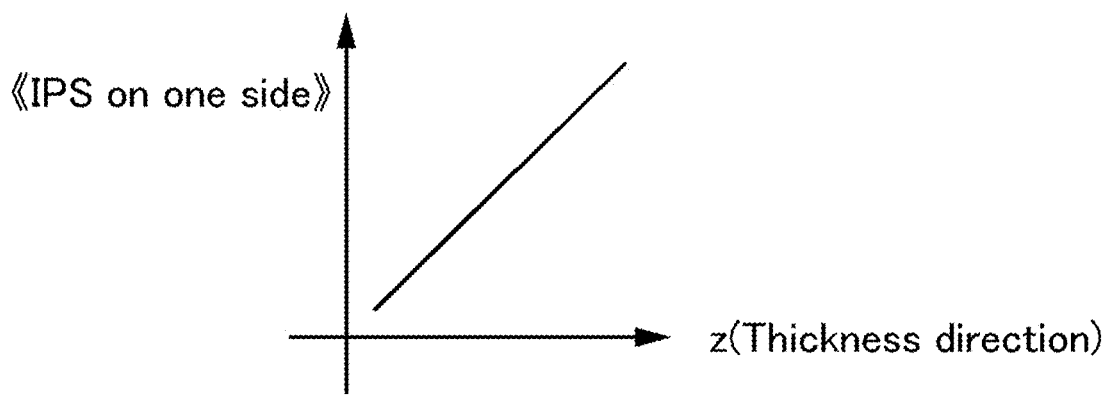
FIG. 13 is a graph of liquid crystal alignment azimuth versus thickness direction of the liquid crystal layer in the liquid crystal element of Embodiment 1.
Figure 14:
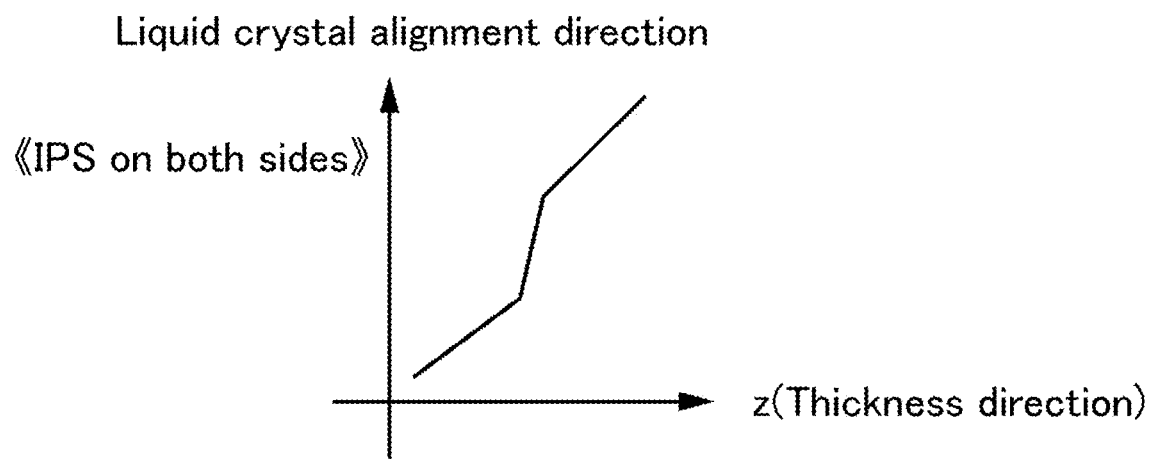
FIG. 14 is a graph of liquid crystal alignment azimuth versus thickness direction of the liquid crystal layer in the liquid crystal element of Modified Example 4 of Embodiment 1.

FIG. 13 is a graph of liquid crystal alignment azimuth versus thickness direction of the liquid crystal layer in the liquid crystal element of Embodiment 1. FIG. 14 is a graph of liquid crystal alignment azimuth versus thickness direction of the liquid crystal layer in the liquid crystal element of Modified Example 4 of Embodiment 1. As shown in FIG. 13 and FIG. 14, in the liquid crystal element of the present modified example including comb-teeth electrodes disposed in the respective substrates, the change of twist of the dual-frequency liquid crystal molecules 310 from the first substrate 100 to the second substrate 200 may weaken at some points as compared to that in Embodiment 1 in which the comb-teeth electrode is disposed in only one of the substrates. In the case of achieving the modulation state with the voltage off, the twisted alignment is achieved only with the chiral dopant added to the dual-frequency liquid crystal molecules, so that the liquid crystal molecules are twisted with a uniform amount of change from the first substrate 100 to the second substrate 200. In contrast, with the voltage turned on between the first substrate 100 and the second substrate 200, the change of twist once becomes gentle in the bulk part. At this time, the modulation property of the circularly polarized light can be improved. The alignment direction of dual-frequency liquid crystal molecules in the middle of the bulk part may be just gently twisted or may not be twisted over a certain region.

Embodiment 2

The features unique to the present embodiment are mainly described here, and description of the matters already described in Embodiment 1 and the modified examples thereof is omitted. The present embodiment is substantially the same as Embodiment 1 and the modified examples thereof, except for further including a Pancharatnam-Berry lens layer.

Figure 15:
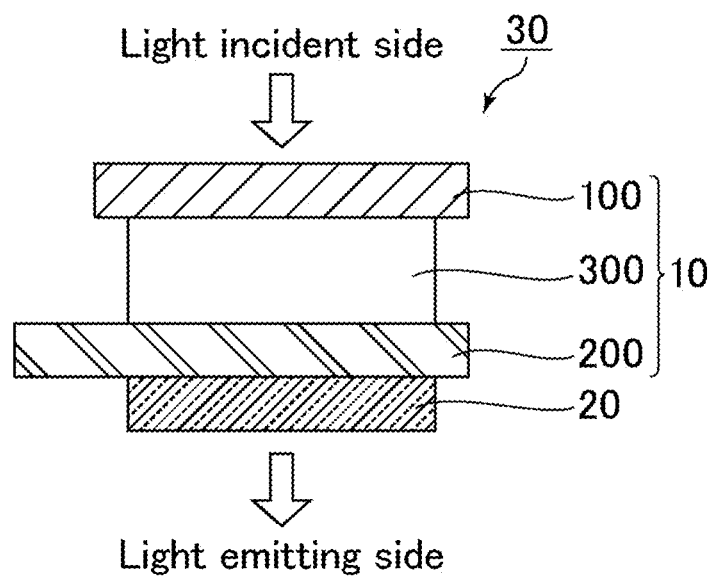
FIG. 15 is a schematic cross-sectional view of a varifocal element of Embodiment 2.

FIG. 15 is a schematic cross-sectional view of a varifocal element of Embodiment 2. As shown in FIG. 15, a varifocal element 30 of the present embodiment includes a liquid crystal element 10 and a Pancharatnam-Berry (PB) lens layer 20 disposed outside the liquid crystal element 10. As described above, the liquid crystal element 10 can modulate circularly polarized light. Also, since the PB lens layer 20 has different focal lengths for the right-handed circularly polarized light and the left-handed circularly polarized light, combination use of the liquid crystal element 10 and the PB lens layer 20 enables a varifocal element 30 whose focal length is variable in a broad bandwidth.

The PB lens layer 20 has a function of causing light to converge and diverge. The PB lens layer 20 can be produced by a method disclosed in, for example, WO 2019/189818.

Modified Example 1 of Embodiment 2

Figure 16:
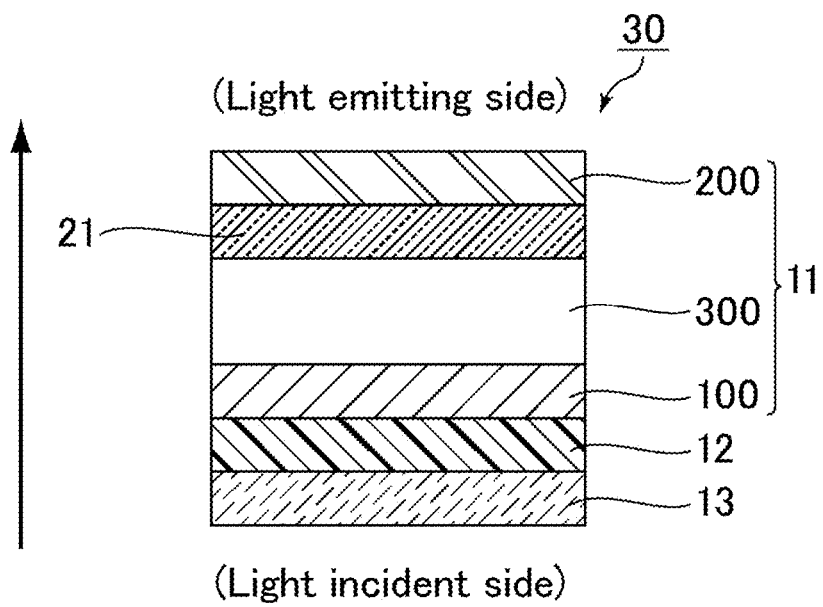
FIG. 16 is a schematic cross-sectional view of a varifocal element of Modified Example 1 of Embodiment 2.

FIG. 16 is a schematic cross-sectional view of a varifocal element of Modified Example 1 of Embodiment 2. The PB lens layer 20 in Embodiment 2 is disposed outside the liquid crystal element 10 (i.e., out-cell). Meanwhile, as shown in FIG. 16, a varifocal element 30 of the present modified example includes a liquid crystal element 10 and a PB lens layer 21 disposed inside the liquid crystal element 10. This configuration can also achieve a varifocal element 30 whose focal length is variable in a broad bandwidth.

The PB lens layer 21 disposed in the cell is, in other words, an in-cell retardation layer that is patterned such that its slow axis direction rotates in the plane. For example, the second substrate 200 is coated with a photosensitive material for forming an in-cell PB lens, the material containing a polymer, so that a film for forming a PB lens is formed, followed by alignment treatment on the film for forming a PB lens. Thus, the PB lens 21 can be disposed in the cell.

Embodiment 3

The features unique to the present embodiment are mainly described here, and description of the matters already described in Embodiment 1, the modified examples thereof, Embodiment 2, and the modified example thereof is omitted. In the present embodiment, a head mounted display including the liquid crystal element 10 is described.

Figure 17:
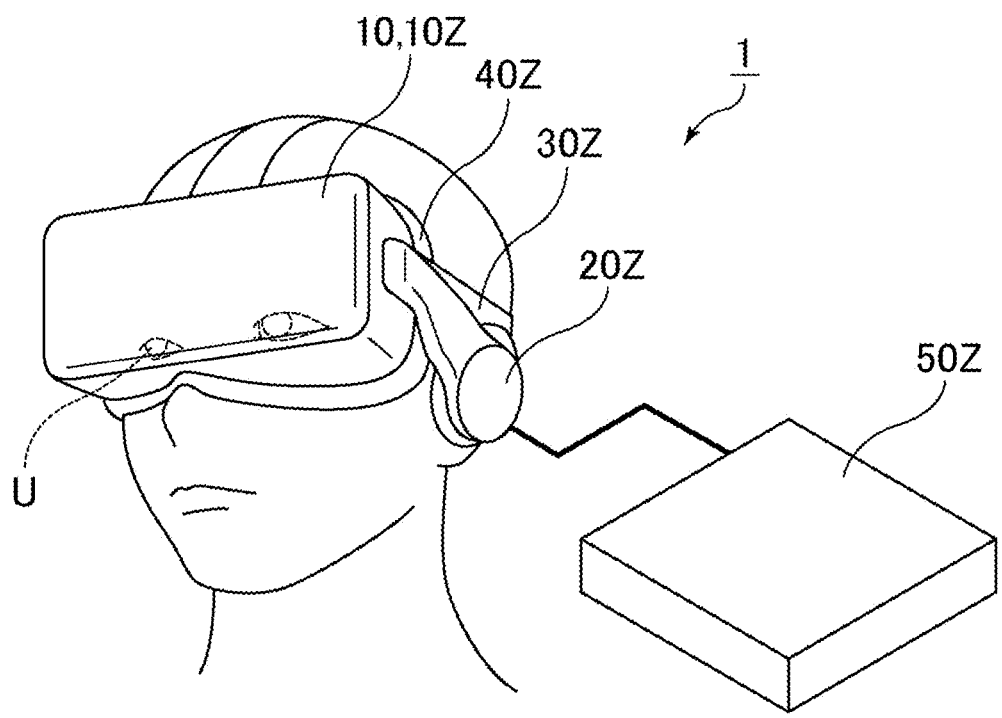
FIG. 17 is a schematic view illustrating an example of a head mounted display of Embodiment 3.

FIG. 17 is a schematic view illustrating an example of a head mounted display of Embodiment 3. As shown in FIG. 17, a head mounted display 1 of the present embodiment includes a liquid crystal element 10. The head mounted display 1 is a display device that a user U can wear on the head, and is a biocular immersive display designed to completely cover the user's eyes when worn on the head.

The head mounted display 1 includes a video output unit 10Z having a function of displaying videos to the user U and including the liquid crystal element 10; a sound output unit 20Z having a function of generating voice, music, sound effects, and other sounds; a wearable part 30Z connecting the video output unit 10Z and the sound output unit 20Z into an integral component and making these units removably wearable on the user U's head; a facial cushion 40Z disposed between the video output unit 10Z and the user U's face. The video output unit 10Z in the present embodiment includes one display.

The head mounted display 1 may include a driving unit 50Z which outputs video display signals and sound output signals. The driving unit 50Z is wired or wirelessly connected to the video output unit 10Z and the sound output unit 20Z. The wireless communication system may be, for example, Bluetooth®.

EXAMPLES

The effects of the present invention are described below with reference to examples and comparative examples. The present invention is not limited to these examples.

Comparative Example 1

Figure 18:
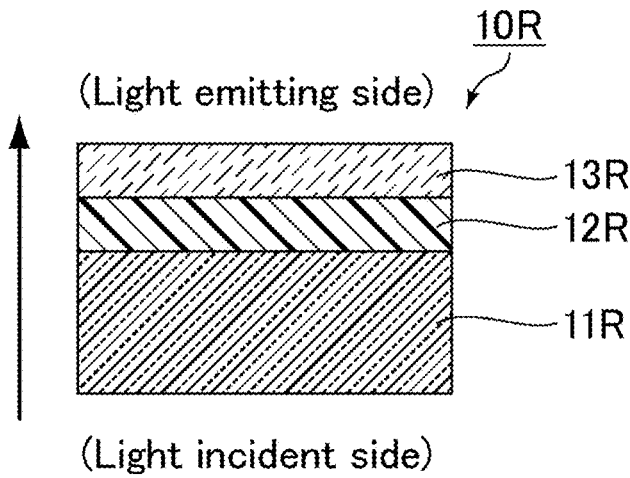
FIG. 18 is a schematic cross-sectional view of a liquid crystal element of Comparative Example 1.
Figure 19:
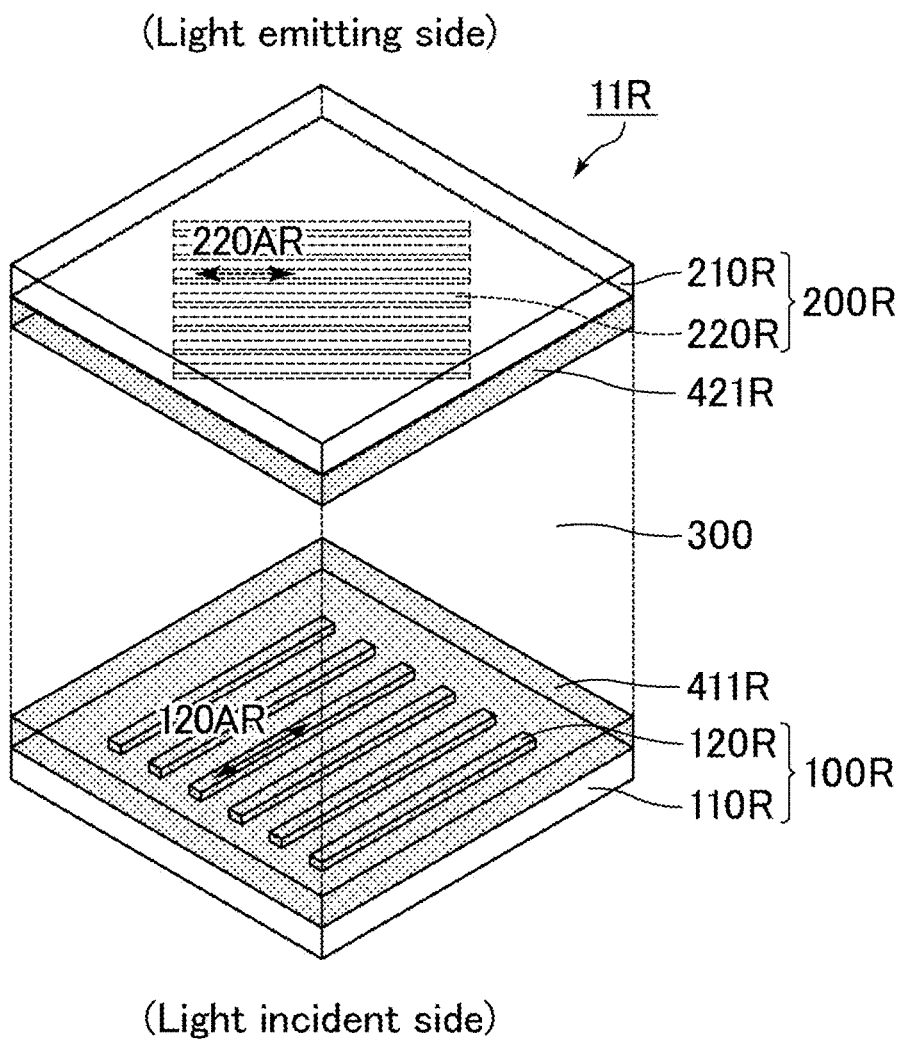
FIG. 19 is a schematic perspective view of the liquid crystal element of Comparative Example 1.
Figure 20:
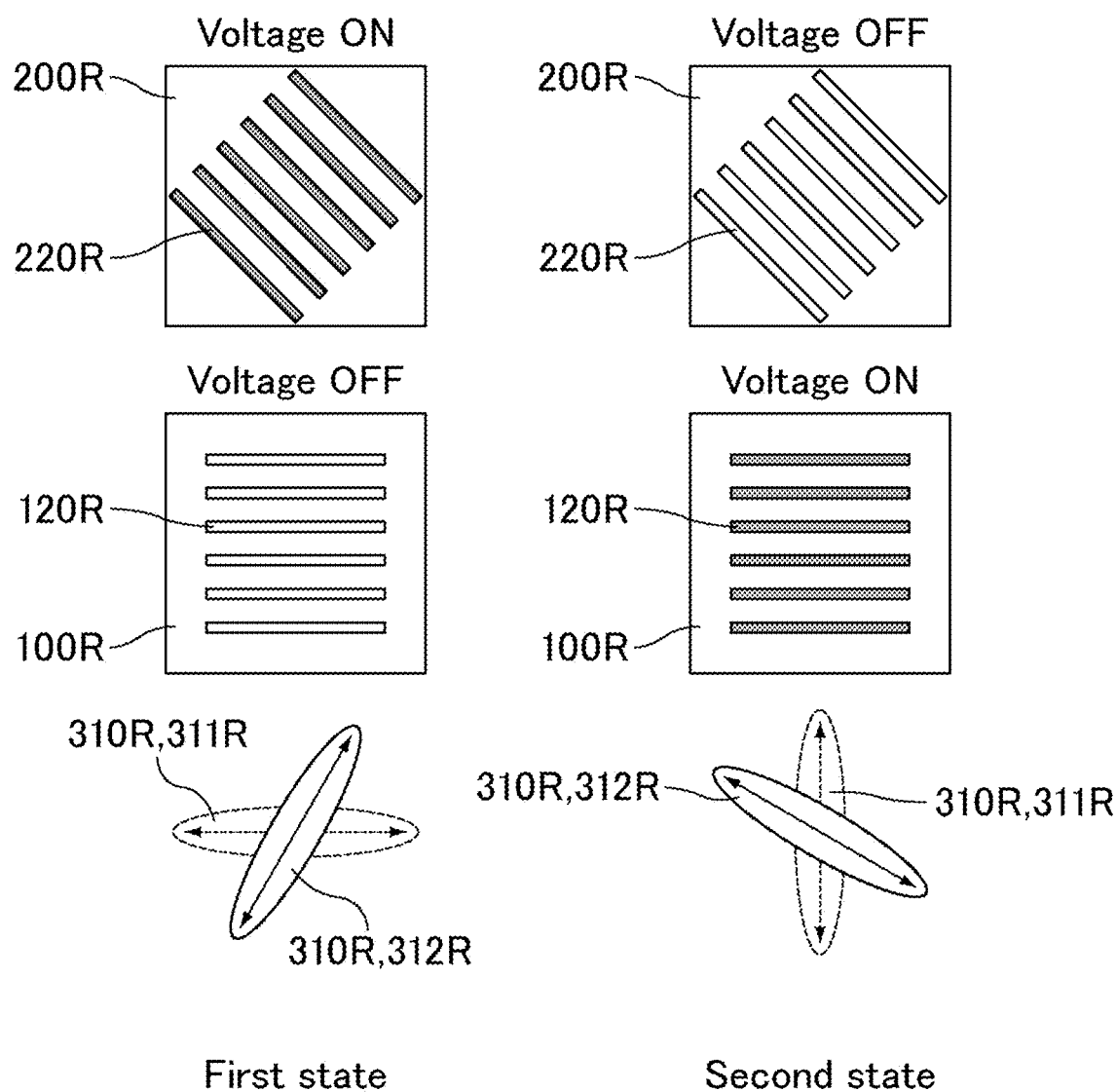
FIG. 20 includes schematic views showing the alignments of liquid crystal molecules in a first state and a second state in the liquid crystal element of Comparative Example 1.
Figure 21:
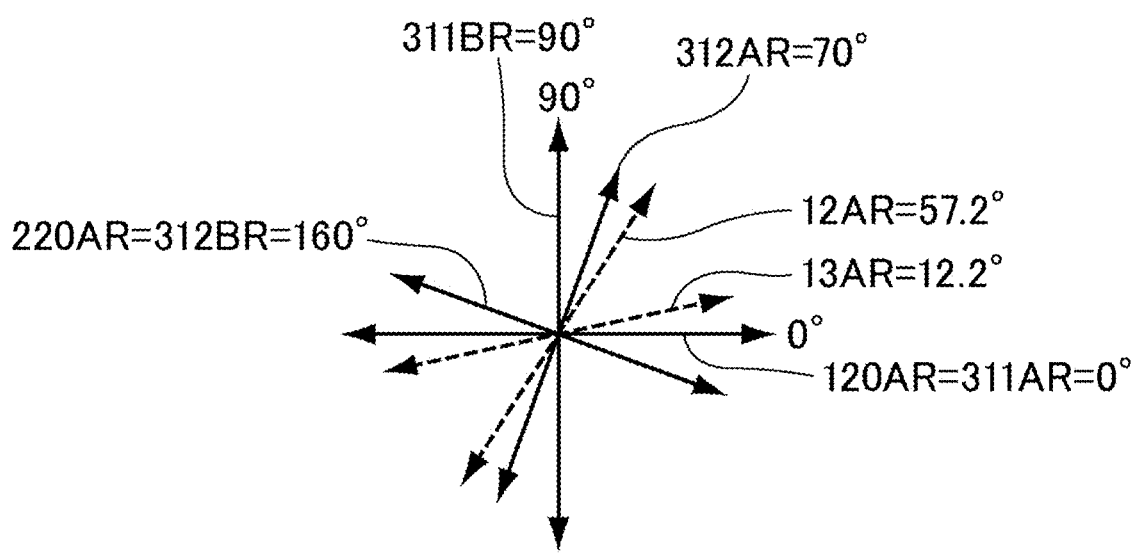
FIG. 21 shows axis azimuths of the liquid crystal element of Comparative Example 1.

FIG. 18 is a schematic cross-sectional view of a liquid crystal element of Comparative Example 1. FIG. 19 is a schematic perspective view of the liquid crystal element of Comparative Example 1. FIG. 20 includes schematic views showing the alignments of liquid crystal molecules in a first state and a second state in the liquid crystal element of Comparative Example 1. FIG. 21 shows axis azimuths of the liquid crystal element of Comparative Example 1.

A liquid crystal element 10R of Comparative Example 1 shown in FIG. 18 to FIG. 21 and corresponding to Example 1 in JP 2023-082644 A was produced. The liquid crystal element 10R of Comparative Example 1 included, in order from the light incident side toward the light emitting side, a liquid crystal cell 11R including a first substrate 100R, a liquid crystal layer 300R containing liquid crystal molecules 310R, and a second substrate 200R; a quarter-wave film exhibiting reverse wavelength dispersion as a first quarter-wave film 12R; and a quarter-wave film exhibiting flat wavelength dispersion as a second quarter-wave film 13R. The slow axis of the quarter-wave film exhibiting reverse wavelength dispersion (slow axis 12AR of the first quarter-wave film 12R) was at an azimuthal angle of 57.2°. The slow axis of the quarter-wave film exhibiting flat wavelength dispersion (slow axis 13AR of the second quarter-wave film 13R) was at an azimuthal angle of 12.2°. The liquid crystal element 10R of Comparative Example 1 was specifically produced as described below.

The first substrate 100R including a first supporting substrate 110R and a first comb-teeth electrode 120R and the second substrate 200R including a second supporting substrate 210R and a second comb-teeth electrode 220R were prepared. The electrode direction of the first substrate 100R (extension direction 120AR of the first comb-teeth electrode 120R) and the electrode direction of the second substrate 200R (extension direction 220AR of the second comb-teeth electrode 220R) formed the angle shown in FIG. 21 when the substrates were attached to each other. Photo-spacers of 3.6 μm in height were arranged near the second substrate 200R.

Polymethyl methacrylate (PMMA) films were then formed, one on the first substrate 100R including the first comb-teeth electrode 120R and the other on the second substrate 200R including the second comb-teeth electrode 220R. A sealing material was drawn on the second substrate 200R. The first substrate 100R and the second substrate 200R were attached to each other with a liquid crystal material (liquid crystal layer 300R) in between, so that the liquid crystal cell 11R was produced.

The liquid crystal material used was a mixture of liquid crystal molecules having a positive anisotropy of dielectric constant (Δn=0.066), 5 wt % dodecyl acrylate (C12A), and a chiral dopant S-811. The concentration of the chiral dopant was set such that the angle of twist between the upper and lower substrates in the liquid crystal cell would be 70°.

The liquid crystal cell 11R was heated to the isotropic phase and then cooled to room temperature while voltage was applied to the first substrate 100R to produce the uniform horizontal alignment liquid crystal cell 11R including the first weak anchoring horizontal alignment film 411R and the second weak anchoring horizontal alignment film 421R. To the liquid crystal cell 11R obtained above were attached the quarter-wave film exhibiting reverse wavelength dispersion (first quarter-wave film 12R) and the quarter-wave film exhibiting flat wavelength dispersion (second quarter-wave film 13R). Thus, the liquid crystal element (sHWP element) 10R of Comparative Example 1 was produced.

Figure 22:
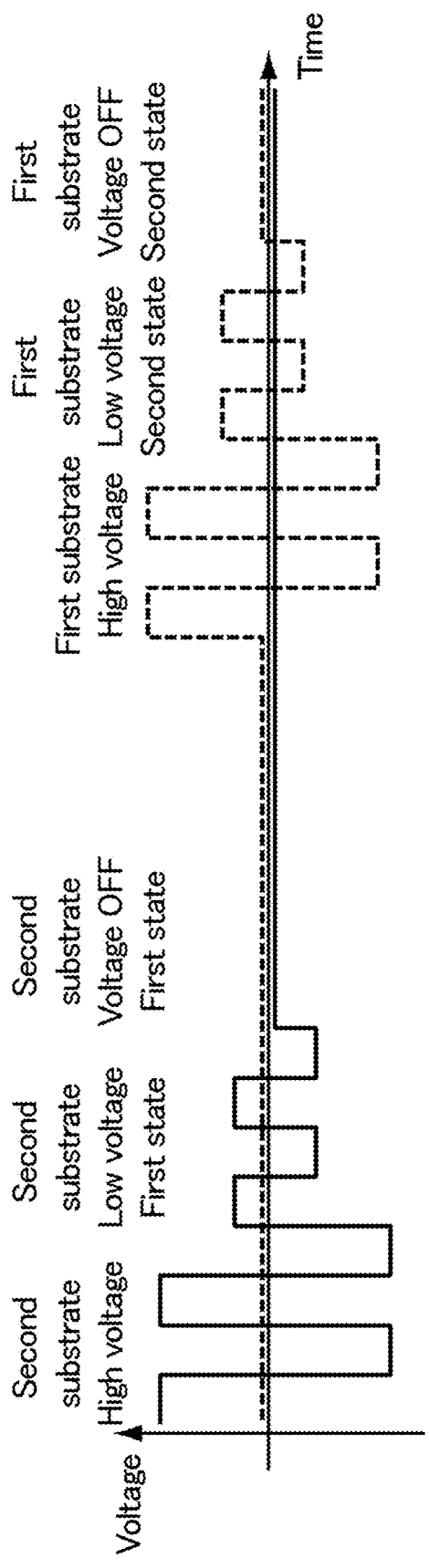
FIG. 22 is a graph of voltage applied to the liquid crystal element of Comparative Example 1.

FIG. 22 is a graph of voltage applied to the liquid crystal element of Comparative Example 1. When voltage was applied to the second substrate 200R in the liquid crystal element 10R of Comparative Example 1 as shown in FIG. 22, the transverse electric field on the second substrate 200R side aligned the liquid crystal molecules 312R near the second substrate 200R in the 70°-direction as shown in FIG. 20. Lowering the voltage applied to the second substrate 200R (not to zero) allowed the twisting force of the chiral dopant added to the liquid crystal material to slide the liquid crystal molecules 311R near the first substrate 100R and thus align the molecules in the 0° direction, while keeping the liquid crystal molecules 312R near the second substrate 200R aligned in the 70° direction along the electric fields. This state was the first state. The molecules remained in the alignment state in the first state when the voltage was turned off.

Conversely, when voltage was applied to the first substrate 100R and then the voltage was lowered, as shown in FIG. 20, the liquid crystal molecules 311R near the first substrate 100R were aligned in the 90° direction (azimuthal angle of) 90° while the liquid crystal molecules 312R near the second substrate 200R were aligned in the 160° direction (azimuthal angle of) 160° under the force of the chiral dopant. This state was the second state. As described above, the liquid crystal element 10R of Comparative Example 1 successfully switched between the second state and the first state by applying voltage to the first substrate 100R or by applying voltage to the second substrate 200R.

As shown in FIG. 21, the first state and the second state were the same in that the alignment was twisted by 70° between the liquid crystal molecules 311R near the first substrate 100R and the liquid crystal molecules 312R near the second substrate 200R, but the entire system was rotated by 90° between these states.

As described above, the liquid crystal element 10R of Comparative Example 1 included positive liquid crystal molecules 310R and included an electrode in the first substrate 100R and an electrode in the second substrate 200R. The extension direction of each electrode and the alignment direction of liquid crystal molecules located at the interface with the electrode were parallel or perpendicular to each other. The liquid crystal average alignment direction of all the liquid crystal molecules in the liquid crystal layer was not parallel or perpendicular to the extension direction of the first comb-teeth electrode 120R, and was not parallel or perpendicular to the extension direction of the second comb-teeth electrode 220R. In the liquid crystal element 10R of Comparative Example 1, the driving method as shown in FIG. 22 was employed, so that the alignment of the liquid crystal molecules was maintained after the voltage was turned off.

Figure 23:
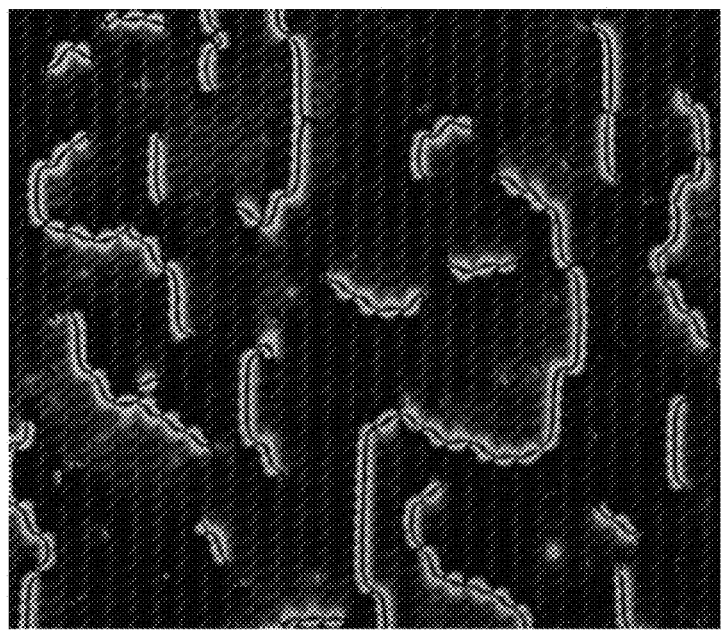
FIG. 23 is a photograph showing the alignment stability evaluation result of the liquid crystal element of Comparative Example 1.

FIG. 23 is a photograph showing the alignment stability evaluation result of the liquid crystal element of Comparative Example 1. After the liquid crystal element 10R of Comparative Example 1 was left to stand at room temperature for one month, the liquid crystal element 10R was observed with a polarizing microscope. The observation confirmed defective alignment in the liquid crystal element 10R of Comparative Example 1 as shown in FIG. 23.

Example 1

Figure 24:
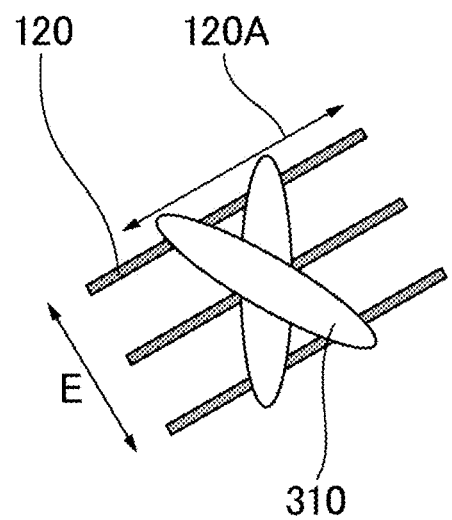
FIG. 24 is a schematic view illustrating the alignment of liquid crystal molecules in the case where a liquid crystal cell in the liquid crystal element of Example 1 was heated to the isotropic phase and then quenched.
Figure 25:
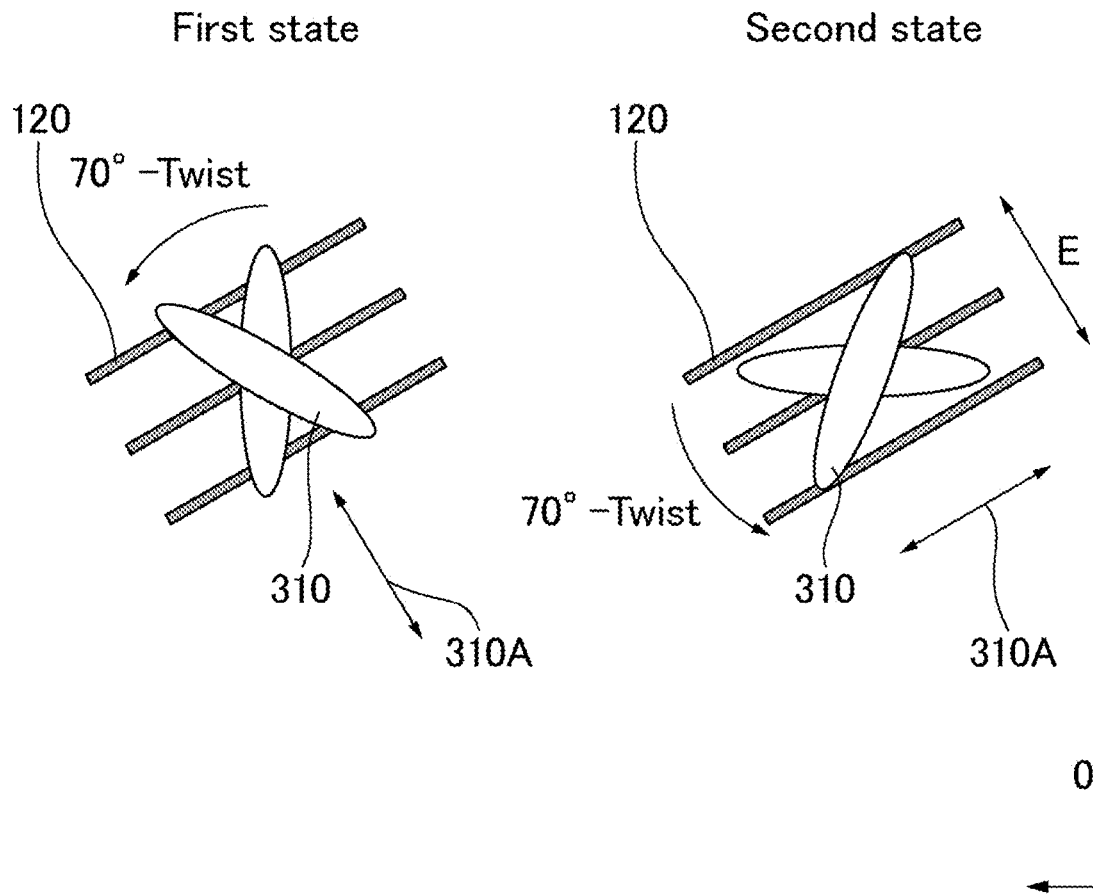
FIG. 25 includes schematic views showing the alignments of liquid crystal molecules in the first state and the second state in the liquid crystal element of Example 1.
Figure 26:
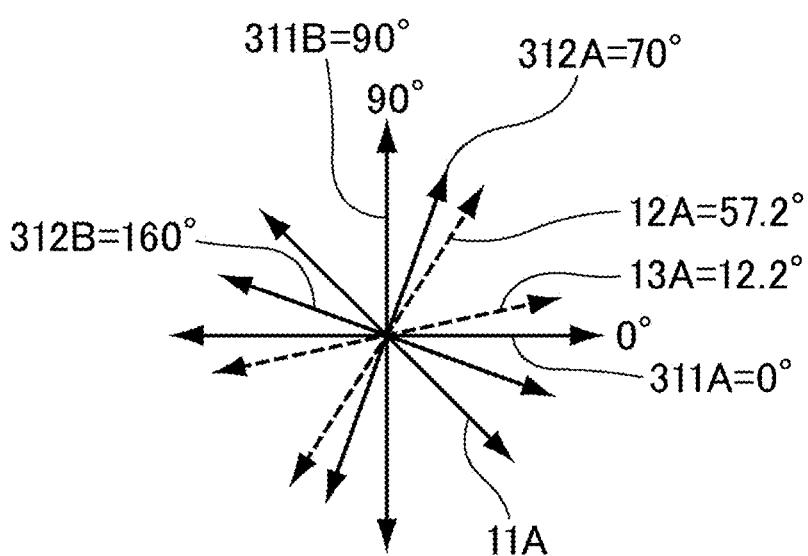
FIG. 26 shows axis azimuths of the liquid crystal element of Example 1.

FIG. 24 is a schematic view illustrating the alignment of liquid crystal molecules in the case where a liquid crystal cell in the liquid crystal element of Example 1 was heated to the isotropic phase and then quenched. FIG. 25 includes schematic views showing the alignments of liquid crystal molecules in the first state and the second state in the liquid crystal element of Example 1. FIG. 26 shows axis azimuths of the liquid crystal element of Example 1. The liquid crystal element 10 of Example 1 shown in FIG. 1 to FIG. 4 and FIG. 24 to FIG. 26 and corresponding to Embodiment 1 was produced as described below.

A first substrate 100 and a second substrate 200 were prepared. The first substrate 100 included the comb-teeth electrode 11 (120) including a comb-teeth-shaped pixel electrode and a comb-teeth-shaped common electrode, with comb-teeth of these electrodes fitting each other. The second substrate 200 included photo-spacers but no electrode. The electrode width of the comb-teeth electrode 120 was 3 μm and the slit width (also referred to as a space) of the comb-teeth electrode 120 was 9 μm. The extension direction 11A (120A) of the comb-teeth electrode 11 (120) was set along the 125°-305° azimuthal angle line.

Next, weak anchoring horizontal alignment films with an infinitesimally small alignment controlling force were formed, one on the first substrate 100 and one on the second substrate 200. In other words, a first weak anchoring horizontal alignment film 411 was formed on the first substrate 100, and a second weak anchoring horizontal alignment film 421 was formed on the second substrate 200. The first weak anchoring horizontal alignment film 411 and the second weak anchoring horizontal alignment film 421 were not subjected to photoalignment treatment or rubbing treatment, so that the first weak anchoring horizontal alignment film 411 and the second weak anchoring horizontal alignment film 421 did not exhibit uniaxial alignment. In other words, the first weak anchoring horizontal alignment film 411 and the second weak anchoring horizontal alignment film 421 had a small in-plane anisotropy. The first weak anchoring horizontal alignment film 411 and the second weak anchoring horizontal alignment film 421 each had an in-plane retardation of 0.8 nm. The first weak anchoring horizontal alignment film 411 had an azimuthal angle anchoring energy of $5\times10^{-6}$ J/m$^2$. The second weak anchoring horizontal alignment film 421 had an azimuthal angle anchoring energy of $5\times10^{-6}$ J/m$^2$. In the present example, as with a common alignment film, a weak anchoring film (whose alignment goes back to the initial alignment when the voltage is turned off) formed by application to a substrate was used. The first weak anchoring horizontal alignment film 411 and the second weak anchoring horizontal alignment film 421 were each formed from one polymer.

A sealing material was drawn on the second substrate 200. The first substrate 100 and the second substrate 200 were attached to each other with a liquid crystal material (liquid crystal layer 300 containing dual-frequency liquid crystal molecules 310) in between, so that the liquid crystal cell 11C was produced. The liquid crystal material was obtained by adding a chiral dopant to dual-frequency liquid crystal molecules. The concentration of the chiral dopant was set such that the angle of twist between the upper and lower substrates in the liquid crystal cell would be 70°.

Since both of the alignment films (first weak anchoring horizontal alignment film 411 and second weak anchoring horizontal alignment film 421) were weak anchoring alignment films in the liquid crystal element 10 of the present example, a common liquid crystal production process would cause defective alignment. The present example therefore employed a method including heating the liquid crystal cell 11C to the isotropic phase and cooling the liquid crystal cell 11C while applying voltage to the comb-teeth electrode 11 in the first substrate 100 to obtain the liquid crystal element 10 with no defective alignment. The voltage applied in this case was lower than the crossover frequency of the dual-frequency liquid crystal (specifically, 30 Hz, 5 V, the sign of Δε of the liquid crystal molecules was positive). This process resulted in, as shown in FIG. 24, uniform alignment with the liquid crystal average alignment direction of the dual-frequency liquid crystal molecules 310 with the voltage off being perpendicular to the extension direction 11A (120A) of the comb-teeth electrode 11 (120). The liquid crystal average alignment direction was measured with Axoscan as described above.

To the liquid crystal cell 11C obtained above were attached the quarter-wave film exhibiting reverse wavelength dispersion (first quarter-wave film 12) and the quarter-wave film exhibiting flat wavelength dispersion (second quarter-wave film 13). Thus, the liquid crystal element (sHWP element) 10 of Example 1 was produced. The first quarter-wave film 12 and the second quarter-wave film 13 in the present example were both positive A plates. The slow axis of the quarter-wave film exhibiting reverse wavelength dispersion (slow axis 12A of the first quarter-wave film 12) was at an azimuthal angle of 57.2°. The slow axis of the quarter-wave film exhibiting flat wavelength dispersion (slow axis 13A of the second quarter-wave film 13) was at an azimuthal angle of 12.2°.

The components of the liquid crystal element 10 of the present example during no voltage application (also referred to as "with the voltage off") or during driving at lower than the crossover frequency of the dual-frequency liquid crystal (also referred to as "during low-frequency driving") were in the relationship shown in the first state in FIG. 25. The incident circularly polarized light here was converted to the opposite-handed circularly polarized light and emitted (modulation state). Meanwhile, the components during driving at the crossover frequency of the dual-frequency liquid crystal or higher (for example, 300 kHz) (also referred to as "during high-frequency driving") were in the relationship shown in the second state in FIG. 25. The incident circularly polarized light in this case was emitted as circularly polarized light with the same polarization direction (no modulation state). When the driving state was further changed from the high-frequency driving to driving with the voltage off or to low-frequency driving, the state was returned to the modulation state. As described above, changing the driving frequency of the liquid crystal molecules or changing between voltage application and no voltage application enabled a device that successfully switched between circularly polarized lights.

In the present example, the high voltage and low voltage as required in Comparative Example 1 were not necessary, and switching between the first state and the second state was successfully achieved by turning on or off the voltage application to the electrode disposed in only one of the substrates.

Figure 27:
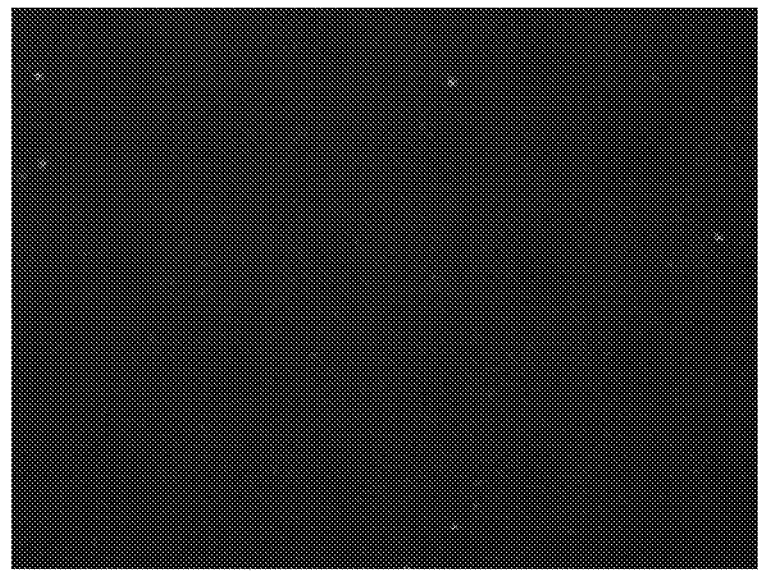
FIG. 27 is a photograph showing the alignment stability evaluation result of the liquid crystal element of Example 1.

FIG. 27 is a photograph showing the alignment stability evaluation result of the liquid crystal element of Example 1. As in Comparative Example 1, the liquid crystal element 10 of Example 1 was left to stand at room temperature for one month, and the liquid crystal element 10 was observed with a polarizing microscope. The observation confirmed that in the liquid crystal element 10 of Example 1, as shown in FIG. 27, uniform alignment with no defective alignment was maintained.

The optical state of the phase modulation element of Example 1 was evaluated with Axoscan available from Axometrics, Inc. to evaluate the circular polarization state of the emission light derived from incident right-handed circularly polarized light (light with S3=+1). The evaluation conditions were visible lights with three wavelengths of 450 nm, 550 nm, and 650 nm and incident azimuthal angle of from 0° to 40°. The evaluation confirmed that the worst Stokes parameter S3 value under all these conditions was −0.92 in the modulation state and 0.94 in the no modulation state, meaning that both states exhibited excellent modulation property. This evaluation used light with S3=+1 as light incident on the liquid crystal element; a S3 value closer to −1 indicates an excellent modulation state, and a S3 value closer to 1 indicates an excellent no modulation state. A S3 value is considered passing if its absolute value is 0.9 or higher.

Example 2

A liquid crystal element of Example 2 was produced as in Example 1, except that the electrode width of the comb-teeth electrode 11 was set to 3 μm and the slit width of the comb-teeth electrode 11 was set to 13 μm. In other words, in Example 2, the space of the comb-teeth electrode 120 was widened as compared to Example 1.

The Stokes parameter S3 in Example 2 was evaluated as in Example 1. The evaluation shows that the polarization modulation property of the liquid crystal element of Example 2 was excellent, with S3=−0.95 in the modulation state and S3=0.96 in the no modulation state. As in Example 1, liquid crystal molecules (bulk) apart from the substrate interfaces presumably reacted to the voltage application in Example 2. In this case, a wider space of the comb-teeth electrode 120 allows the liquid crystal molecules to uniformly rotate in the plane to lead to an even better S3 value. This is considered to be the reason why a better polarization modulation property was achieved in Example 2 than in Example 1.

Example 3

A liquid crystal element of Example 3 was produced as in Example 1, except that the electrode width of the comb-teeth electrode 11 was set to 2 μm and the slit width of the comb-teeth electrode 11 was set to 5 μm. In other words, in Example 3, the pitch of the comb-teeth electrode 11 was narrower than that in Example 1.

The Stokes parameter S3 in Example 3 was evaluated as in Example 1. The evaluation shows that the polarization modulation property of the liquid crystal element of Example 3 was excellent, with S3=−0.91 in the modulation state and S3=0.92 in the no modulation state. The evaluation indicates that a narrow pitch enabled application of a lower voltage but the circular polarization modulation property slightly worsened as compared to Example 1.

Example 4

Figure 28:
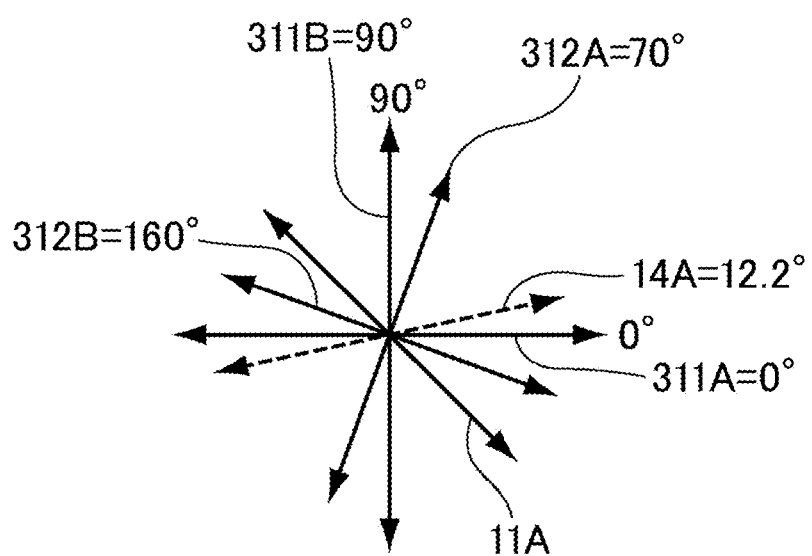
FIG. 28 shows axis azimuths of a liquid crystal element of Example 4.

FIG. 28 shows axis azimuths of a liquid crystal element of Example 4. A liquid crystal element 10 of Example 4 shown in FIG. 7 and FIG. 28 and corresponding to Modified Example 1 of Embodiment 1 was produced. The liquid crystal element 10 of Example 4 had a configuration similar to that in Example 1, except for not including the first quarter-wave film 12 or the second quarter-wave film 13 and including a quarter-wave film 14. The quarter-wave film 14 exhibited reverse wavelength dispersion and had a slow axis 14A at an azimuthal angle of 12.2°.

The Stokes parameter S3 in Example 4 was evaluated as in Example 1. The evaluation shows that the polarization modulation property of the liquid crystal element of Example 3 was excellent, with S3=−0.9 in the modulation state and S3=0.9 in the no modulation state.

Example 5

Figure 29:
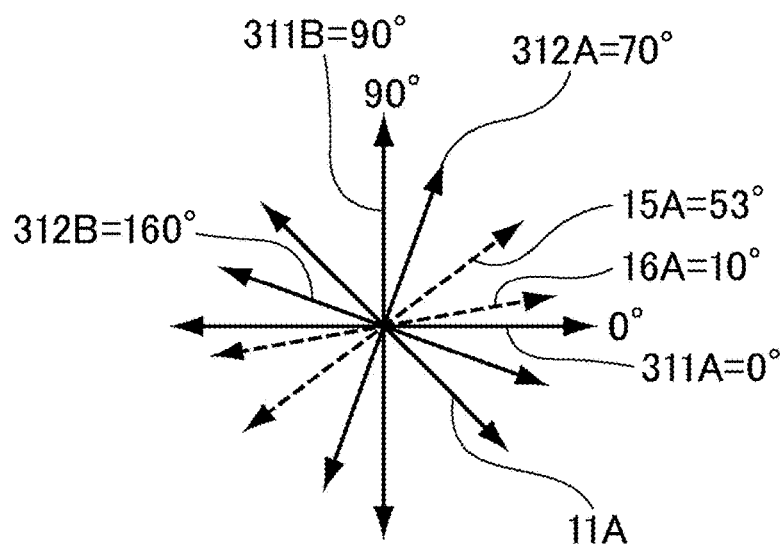
FIG. 29 shows axis azimuths of a liquid crystal element of Example 5.

FIG. 29 shows axis azimuths of a liquid crystal element of Example 5. A liquid crystal element 10 of Example 5 shown in FIG. 8 and FIG. 29 and corresponding to Modified Example 2 of Embodiment 1 was produced. The liquid crystal element 10 of Example 5 had a configuration similar to that in Example 1, except for not including the first quarter-wave film 12 or the second quarter-wave film 13 and including a positive A plate 15 and a negative A plate 16.

The positive A plate 15 had an in-plane retardation (Re) of 140 nm at a wavelength of 550 nm, a ratio of an in-plane retardation at a wavelength of 450 nm to an in-plane retardation at a wavelength of 550 nm (Re (450)/Re (550)) of 1.01, a ratio of an in-plane retardation at a wavelength of 650 nm to an in-plane retardation at a wavelength of 550 nm (Re (650)/Re (550)) of 0.99, and a slow axis 15A at an azimuthal angle of 53°.

The negative A plate 16 had an in-plane retardation (Re) of 120 nm at a wavelength of 550 nm, a ratio of an in-plane retardation at a wavelength of 450 nm to an in-plane retardation at a wavelength of 550 nm (Re (450)/Re (550)) of 1.08, a ratio of an in-plane retardation at a wavelength of 650 nm to an in-plane retardation at a wavelength of 550 nm (Re (650)/Re (550)) of 0.96, and a slow axis 16A at an azimuthal angle of 10°.

The Stokes parameter S3 in Example 5 was evaluated as in Example 1. The evaluation shows that the polarization modulation property of the liquid crystal element of Example 5 was excellent, with S3=−0.94 in the modulation state and S3=0.95 in the no modulation state.

The results in Example 4 and Example 5 demonstrate that though a single quarter-wave film alone achieved the effect of the present invention, a stack of multiple quarter-wave films further improved the polarization modulation property. The results also indicate that a structure including both the positive A plate 15 (axis azimuth of slow axis 15A=53°) and the negative A plate 16 (axis azimuth of slow axis 16A=10°) is preferred in widening the viewing angle.

Example 6

A liquid crystal element 10 of Example 6 having a configuration similar to that in Example 1, except for including the liquid crystal cell 11C in Modified Example 3 of Embodiment 1 shown in FIG. 9, was produced. The liquid crystal element 10 of the present example had a configuration similar to that in Example 1, except that the first substrate 100 included no comb-teeth electrode 11 and the second substrate 200 included the comb-teeth electrode 11.

The Stokes parameter S3 in Example 6 was evaluated as in Example 1. The evaluation shows that the polarization modulation property of the liquid crystal element of Example 6 was excellent, with S3=−0.92 in the modulation state and S3=0.94 in the no modulation state.

As shown in FIG. 15, a PB lens layer 20 was attached to the liquid crystal element (phase modulation element) 10 of the present example to produce a liquid crystal lens (varifocal element 30) including the PB lens layer 20 outside the liquid crystal element 10. The varifocal element 30 of the present example included the comb-teeth electrode 11 only in the substrate (second substrate 200) located in the direction of curvature of the FPC 10F, and included the PB lens layer 20 outside the liquid crystal element 10. The liquid crystal lens (varifocal element 30) of the present example was confirmed to be varifocal in a broad bandwidth.

Figure 30:
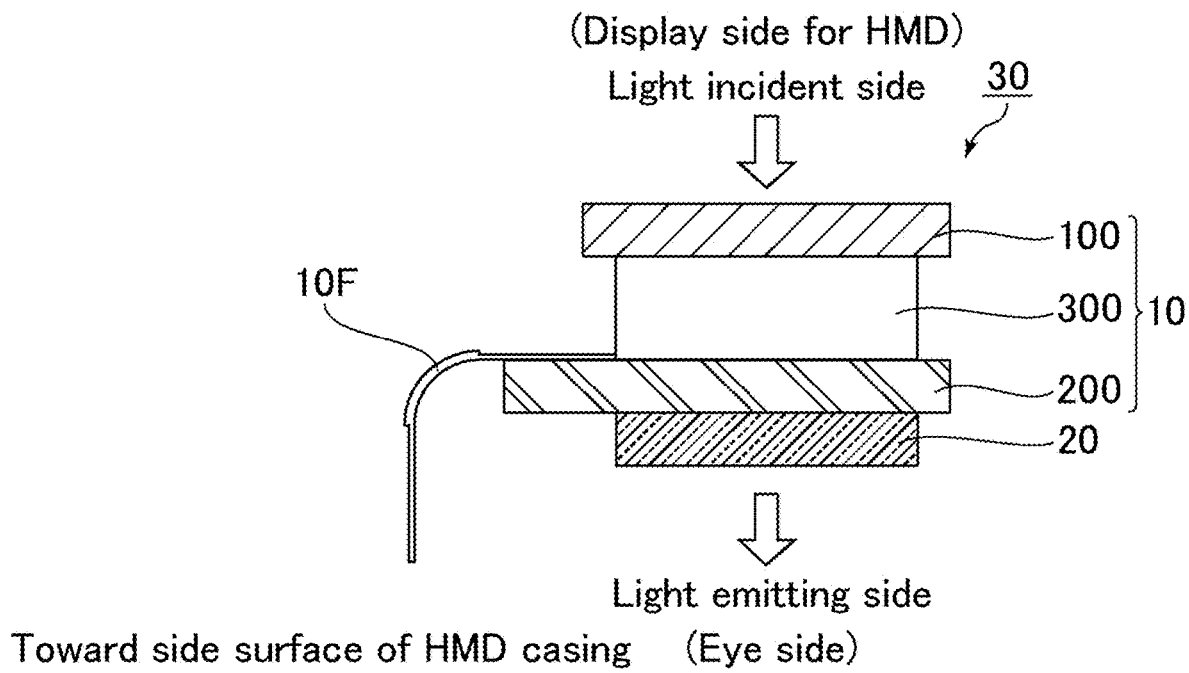
FIG. 30 is a schematic cross-sectional view of a varifocal element of Example 6.
Figure 31:
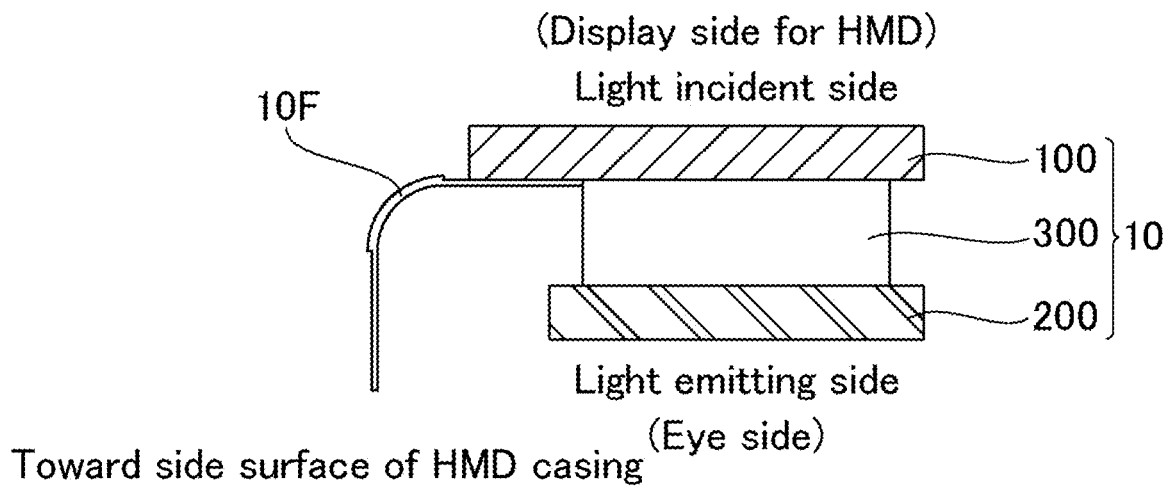
FIG. 31 is a schematic cross-sectional view of a varifocal element in which only the light incident side substrate includes an electrode.

FIG. 30 is a schematic cross-sectional view of the varifocal element of Example 6. FIG. 31 is a schematic cross-sectional view of a varifocal element in which only the light incident side substrate includes an electrode. The liquid crystal elements 10 of Examples 1 to 5 each included the comb-teeth electrode 11 (IPS electrode) in the substrate (first substrate 100) located opposite to the direction of curvature of the FPC 10F (i.e., light incident side). Meanwhile, the liquid crystal element 10 of the present example included the comb-teeth electrode 11 (IPS electrode) in the substrate (second substrate 200) located in the direction of curvature of the FPC 10F (i.e., light emitting side), which was also found to be a suitable configuration.

Example 7

A varifocal element 30 of Example 7 shown in FIG. 16 and corresponding to Modified Example 1 of Embodiment 2 was produced. The varifocal element 30 of Example 7 had a configuration similar to the varifocal element 30 of Example 6, except that the first quarter-wave film 12 and the second quarter-wave film 13 were located on the side of the first substrate 100 opposite to the liquid crystal layer 300, and the PB lens layer 21 was disposed between the liquid crystal layer 300 and the second substrate 200.

In Example 7, the retardation films (first quarter-wave film 12 and second quarter-wave film 13) were disposed on the light incident side, the PB lens layer 21 was disposed between the second substrate 200 located on the light emitting side and the liquid crystal layer 300, and the second substrate 200 included an electrode. When the PB lens layer 21 is disposed inside the liquid crystal element 10 (in-cell), the phase modulation needs to be completed before light passes through the PB lens layer 21. Thus, the retardation films (first quarter-wave film 12 and second quarter-wave film 13) were disposed on the light incident side. The varifocal element 30 (liquid crystal lens) of the present example was configured to be varifocal in a broad bandwidth.

Figure 32:
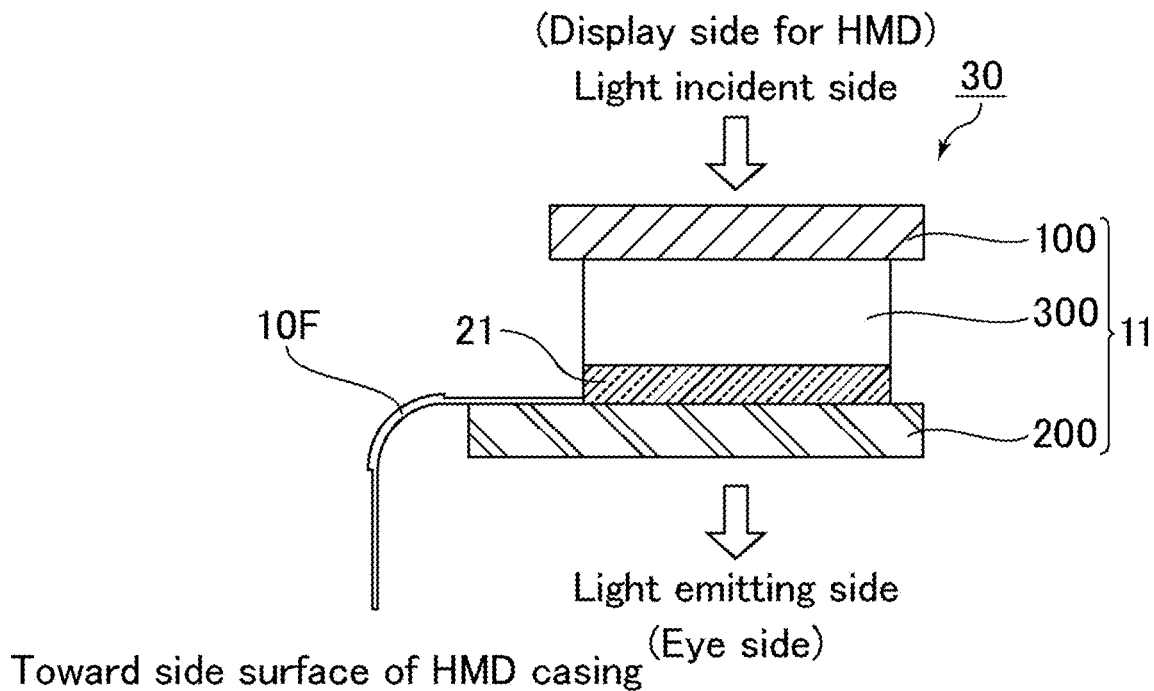
FIG. 32 is a schematic cross-sectional view illustrating wiring in a varifocal element of Example 7.

FIG. 32 is a schematic cross-sectional view illustrating wiring in a varifocal element of Example 7. As in Example 6, the stack structure of the present example in which the electrode is disposed in the second substrate 200 located on the light emitting side (direction of curvature of the FPC 10F) is considered suitable for the varifocal element of the present example in consideration of the strength against bending of the FPC as shown in FIG. 32.

Example 8

A liquid crystal element 10 of Example 8 having a configuration similar to that in Example 1, except for including the liquid crystal cell 11C in Modified Example 4 of Embodiment 1 shown in FIG. 12, was produced. The liquid crystal element 10 of the present example had a configuration similar to that in Example 1, except that the first substrate 100 included a first substrate side comb-teeth electrode 120 and the second substrate 200 included a second substrate side comb-teeth electrode 220. The extension direction (slit direction) of the first substrate side comb-teeth electrode 120 and that of the second substrate side comb-teeth electrode 220 were set parallel to each other.

The Stokes parameter S3 in Example 8 was evaluated as in Example 1. The evaluation shows that the polarization modulation property of the liquid crystal element of Example 8 was excellent, with S3=−0.92 in the modulation state and S3=0.95 in the no modulation state.

Example 9

Figure 33:
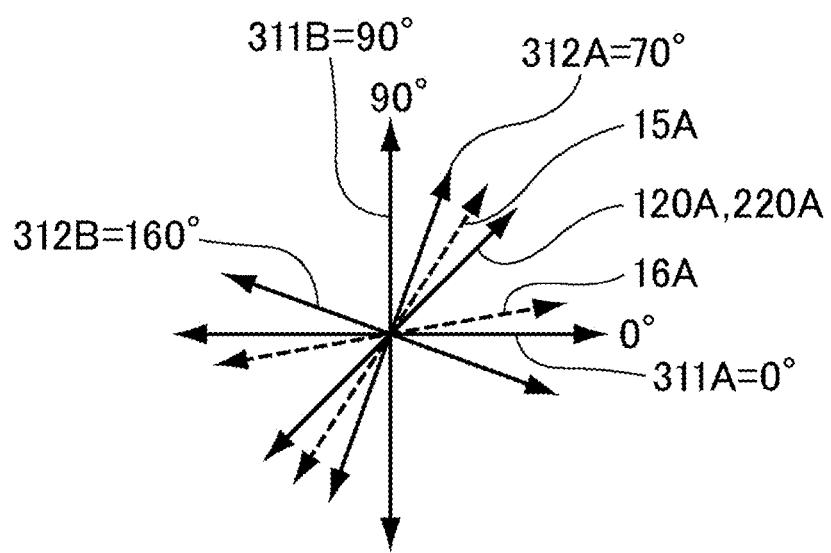
FIG. 33 shows axis azimuths of a liquid crystal element of Example 9.

FIG. 33 shows axis azimuths of a liquid crystal element of Example 9. The liquid crystal element 10 of Example 9 shown in FIG. 33 was produced. The liquid crystal element 10 of Example 9 had a configuration similar to the liquid crystal element 10 of Example 5, except that the slow axis 15A of the positive A plate 15 was at an azimuthal angle of 53°, the slow axis 16A of the negative A plate 16 was at an azimuthal angle of 10°, and the extension direction 120A of the comb-teeth electrode 120 was at an azimuthal angle of 45°.

In Example 1 to Example 8, the modulation state was achieved with the voltage off or during low-frequency driving, and the no modulation state was achieved during high-frequency driving. In the present example, the no modulation state was achieved with the voltage off or during low-frequency driving, and the modulation state was achieved during high-frequency driving.

The Stokes parameter S3 in Example 9 was evaluated as in Example 1. The evaluation shows that the polarization modulation property of the liquid crystal element of Example 9 was excellent, with S3=−0.92 in the modulation state and S3=0.94 in the no modulation state.

Example 10

A liquid crystal element 10 of Example 10 was produced as in Example 1, except that the first weak anchoring horizontal alignment film 411 and the second weak anchoring horizontal alignment film 421 were each formed using a mixed material of two polymers different in refractive index from each other.

As shown in FIG. 5, in the liquid crystal element of Example 10, the polymer with a higher refractive index was concentrated near the substrate (first substrate 100) and the polymer with a lower refractive index was concentrated near the side in contact with the liquid crystal layer 300.

The Stokes parameter S3 in Example 10 was evaluated as in Example 1. The evaluation shows that the polarization modulation property of the liquid crystal element of Example 10 was excellent, with S3=−0.92 in the modulation state and S3=0.94 in the no modulation state.

Also, the hazes of the liquid crystal elements of Example 1 and Example 10 were evaluated. The evaluation demonstrated that the haze of the liquid crystal element of Example 1 was 4.3% and the haze of the liquid crystal element of Example 10 was 2.1%, meaning that the haze of the liquid crystal element of Example 10 was better than that of Example 1.

The haze refers to a value determined by measuring the diffuse transmittance and the total light transmittance and substituting these values into the equation: haze (unit: %)=100×(diffuse transmittance)/(total light transmittance). The diffuse transmittance and the total light transmittance were measured with a haze meter (product name: NDH-2000) available from Nippon Denshoku Industries Co., Ltd.

REFERENCE SIGNS LIST

1: head mounted display
10, 10R: liquid crystal element

10F: flexible printed circuit (FPC)
10Z: video output unit
11, 120, 120R, 220, 220R: comb-teeth electrode
11A, 120A, 120AR, 220A, 220AR: extension direction
11C, 11R: liquid crystal cell
11E: linear electrode
11S: slit
12, 12R, 13, 13R, 14: quarter-wave film
12A, 12AR, 13A, 13AR, 14A, 15A, 16A: slow axis
15: positive A plate
16: negative A plate
20, 21: Pancharatnam-Berry (PB) lens layer
20Z: sound output unit
30Z: wearable part
40Z: facial cushion
50Z: driving unit
30: varifocal element
100, 100R: first substrate
110, 110R, 210, 210R: supporting substrate
200, 200R: second substrate
300, 300R: liquid crystal layer
310, 311, 312: dual-frequency liquid crystal molecule
310A: liquid crystal average alignment direction
310R, 311R, 312R: liquid crystal molecule
311A, 311B, 312A, 312B: alignment direction
411, 411R, 421, 421R: weak anchoring horizontal alignment film
500: retardation film
E: electric field
U: user

What is claimed is:

1. A liquid crystal element sequentially comprising:
a first substrate;
a first weak anchoring horizontal alignment film;
a liquid crystal layer containing dual-frequency liquid crystal molecules;
a second weak anchoring horizontal alignment film; and
a second substrate,
at least one of the first substrate or the second substrate comprising a comb-teeth electrode for electric field generation in the liquid crystal layer,
the dual-frequency liquid crystal molecules being twist-aligned between the first substrate and the second substrate with voltage applied and with no voltage applied,
a direction of twist of the dual-frequency liquid crystal molecules with voltage applied and a direction of twist of the dual-frequency liquid crystal molecules with no voltage applied being the same as each other,
an alignment direction of dual-frequency liquid crystal molecules located in a center of the liquid crystal layer in a thickness direction being orthogonal or parallel to an extension direction of the comb-teeth electrode.

2. The liquid crystal element according to claim 1, wherein the first weak anchoring horizontal alignment film has an azimuthal angle anchoring energy of less than $1\times10^{-4}$ J/m$^2$.

3. The liquid crystal element according to claim 1, wherein the first weak anchoring horizontal alignment film contains a polymer including at least one of a group represented by the following structural formula (P1) or a group represented by the following structural formula (P2):

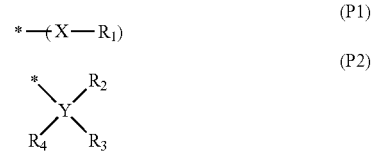

where X includes at least one of an ether group, an ester group, or an amide group; $R_1$, $R_2$, $R_3$, and $R_4$ each independently represent a hydrocarbon group; and Y represents a carbon atom or a silicon atom.

4. The liquid crystal element according to claim 1, wherein the second weak anchoring horizontal alignment film has an azimuthal angle anchoring energy of less than $1\times10^{-4}$ J/m$^2$.

5. The liquid crystal element according to claim 1, wherein the second weak anchoring horizontal alignment film contains a polymer having at least one of a group represented by the following structural formula (P1) or a group represented by the following structural formula (P2):

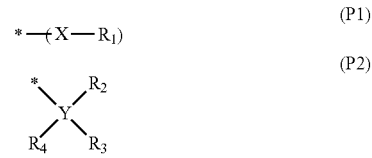

where X includes at least one of an ether group, an ester group, or an amide group; $R_1$, $R_2$, $R_3$, and $R_4$ each independently represent a hydrocarbon group; and Y represents a carbon atom or a silicon atom.

6. The liquid crystal element according to claim 1, wherein the first weak anchoring horizontal alignment film and the second weak anchoring horizontal alignment film do not exhibit uniaxial alignment.

7. The liquid crystal element according to claim 1, wherein the first weak anchoring horizontal alignment film and the second weak anchoring horizontal alignment film each introduce an in-plane retardation of less than 1 nm.

8. The liquid crystal element according to claim 1, wherein with no voltage applied, the alignment direction of the dual-frequency liquid crystal molecules located in the center of the liquid crystal layer in the thickness direction is orthogonal to the extension direction of the comb-teeth electrode.

9. The liquid crystal element according to claim 1, wherein the comb-teeth electrode is disposed only in either the first substrate or the second substrate.

10. The liquid crystal element according to claim 1, further comprising a first substrate side comb-teeth electrode disposed in the first substrate and a second substrate side comb-teeth electrode disposed in the second substrate, each of the first substrate side comb-teeth electrode and the second substrate side comb-teeth electrode being identical to the comb-teeth electrode,
wherein an extension direction of the first substrate side comb-teeth electrode is parallel to an extension direction of the second substrate side comb-teeth electrode.

11. The liquid crystal element according to claim 1, wherein a ratio of an electrode width to a slit width ((electrode width):(slit width)) of the comb-teeth electrode is from 1:2 to 1:6.

12. The liquid crystal element according to claim 1, wherein a ratio of a thickness of the liquid crystal layer to a slit width of the comb-teeth electrode ((thickness of liquid crystal layer):(slit width)) is from 1:2.5 to 1:10.

13. The liquid crystal element according to claim 1, further comprising a retardation film disposed on at least one of a side of the first substrate opposite to the liquid crystal layer or a side of the second substrate opposite to the liquid crystal layer.

14. The liquid crystal element according to claim 13, wherein the retardation film includes, in order from a side closer to the liquid crystal layer, a first quarter-wave film and a second quarter-wave film.

15. The liquid crystal element according to claim 1, wherein at least one horizontal alignment film selected from the first weak anchoring horizontal alignment film and the second weak anchoring horizontal alignment film is in contact with the comb-teeth electrode and contains at least two polymers different in refractive index from each other, and
a polymer having a smallest refractive index among the at least two polymers is in contact with the liquid crystal layer.

16. The liquid crystal element according to claim 1, wherein a ratio of an azimuthal angle anchoring energy of the second weak anchoring horizontal alignment film to an azimuthal angle anchoring energy of the first weak anchoring horizontal alignment film is 10 or less.

17. The liquid crystal element according to claim 1, wherein the first substrate or the second substrate includes a curved flexible printed circuit, and
the comb-teeth electrode is disposed only in either the first substrate or the second substrate, whichever is located in a direction of curvature of the flexible printed circuit.

18. A head mounted display, comprising the liquid crystal element according to claim 1.

* * * * *